United States Patent
Konno et al.

[11] Patent Number: 6,078,955
[45] Date of Patent: Jun. 20, 2000

[54] METHOD FOR CONTROLLING A COMPUTER SYSTEM INCLUDING A PLURALITY OF COMPUTERS AND A NETWORK PROCESSED AS A USER RESOURCE

[75] Inventors: Chisato Konno, Inagi; Katsuro Kikuchi, Hachioji, both of Japan

[73] Assignee: Hitachi, Ltd., Tokyo, Japan

[21] Appl. No.: 08/917,726

[22] Filed: Aug. 27, 1997

[30] Foreign Application Priority Data

Aug. 30, 1996 [JP] Japan ................................. 8-229693

[51] Int. Cl.[7] ............................. G06F 13/00; G06F 15/16
[52] U.S. Cl. ........................ 709/224; 709/225; 709/226; 709/100
[58] Field of Search ................................. 709/224, 225, 709/226, 201, 202, 203, 223, 229, 100, 101, 102, 103, 104, 105, 106

[56] References Cited

U.S. PATENT DOCUMENTS

| | | | |
|---|---|---|---|
| 5,341,477 | 8/1994 | Pitkin et al. | 709/226 |
| 5,867,706 | 2/1999 | Martin et al. | 709/105 |
| 5,881,238 | 3/1999 | Aman et al. | 709/226 |
| 5,884,037 | 3/1999 | Aras et al. | 709/226 |
| 5,886,643 | 3/1999 | Diebboll et al. | 340/825.08 |
| 5,889,520 | 3/1999 | Glaser | 345/349 |
| 5,905,868 | 5/1999 | Baghai et al. | 709/224 |

*Primary Examiner*—Dung C. Dinh
*Assistant Examiner*—Abdullahi E. Salad
*Attorney, Agent, or Firm*—Antonelli, Terry, Stout & Kraus, LLP

[57] ABSTRACT

In a computer system including a plurality of computers interconnected through a network, a specific computer A in the computer system manages the computer resource information and the operating condition information such as for a CPU, a file and a memory and the user resource information such as file data and a program of each computer of the computer system. When a user issues a request from a computer C to log in to the computer system, the request is reported to the computer A, and the information related to the user is returned to the computer C with reference to the user resource information held by the computer A. Then, the computer C acquires the file and the usable program held by the user in the computer system and executes a process, whereby the whole system can be used as resources of each user.

13 Claims, 18 Drawing Sheets

P : PROGRAM SIZE
B/I : PROCESSING MODE
(BATCH-TYPE / INTERACTIVE)
L : AVERAGE PROCESSING LOAD
D : DATA FILE AMOUNT

COMPUTER PROCESSING CAPACITY
$C_i$ : CPU PROCESSING CAPACITY
$M_i$ : MEMORY AMOUNT
$F_i$ : FILE CAPACITY
WHERE
    i = 0 : LOG-IN TERMINAL
    i = 1 : COMPUTER WITH PROGRAM
    i = 2 : COMPUTER WITH FILE
    OTHERWISE, i DESIGNATES
    INTENDED SERVER

METHOD FOR CONTROLLING A COMPUTER SYSTEM INCLUDING A PLURALITY OF COMPUTERS AND A NETWORK PROCESSED AS A USER RESOURCE

BACKGROUND OF THE INVENTION

The present invention relates to a method of controlling a computer system including a plurality of computers interconnected by a network and used by a plurality of users through a plurality of types of computers, in which the whole computer system is usable as a computer resource of each user and provides an environment usable by each user without being conscious of the fact that a plurality of types of the computers are involved or the types of the computers included in the system.

In a conventional computer system including a plurality of computers interconnected by a network, an instruction (a process request) is given to the computer system by a user being conscious of the difference between the individual computers and the presence of files and programs to be used in the computer. A computer having a program is interrupted by a remote log-in or given an instruction to execute a program on the particular computer by a remote procedure call. Before execution of the program, however, it is necessary that a file required by the program be moved appropriately onto the computer.

In contrast, according to the CORBA (common object request broker architecture) specification proposed by the U.S. Object Management Group (OMG) assuring the coordination between the presence of a program for the whole computer system and the cooperation between programs, the use of and cooperation between the programs can be realized without being conscious of the actual presence of the programs on the computer system by registration in the ORB (object request broker) of the specification. This specification, however, defines a logical appearance of the presence of the programs registered in ORB in advance, in spite of the fact that the presence of the programs is fixed in the computers registered in advance. Also, there is no provision for the optimum use of the overall resources of the computer system.

Further, in a conventional computer system including a plurality of computers connected by a network, assume that a computer logging in to the computer system to execute some processing program has not any program or a file. Although such a program or a file can be retrieved from within the computer system through the network, the user is required to give an express instruction to the computer for retrieval in all cases.

Conventional computer systems intended to automatically select an optimum place of execution of a requested job from among the computers interconnected to a network are disclosed in JP-A-2-120968, JP-A-5-134959, JP-A-5-173990, etc. In these conventional systems, the place of executing a requested job is determined by monitoring the hardware resources such as the operating conditions and the amount of file of the computers connected to the network. Such a request is requested, since a plurality of computers are connected to the network. In this case, the location of a program and a file for executing a job are required to be indicated by the user consciously in advance.

Further, in a conventional computer system including a plurality of computers interconnected by a network, the interface is different in dependence on the computer (terminal) logging in to the computer system. In addition, the type of the process that can be requested from a computer was also dependent on the particular computer.

SUMMARY OF THE INVENTION

An object of the present invention is to provide a method of controlling a computer system including a plurality of computers in which the files owned and the programs usable by each user on the computer system remain unchanged for the user, and regardless of the computer through which the computer system is logged in to, the use of the computer system by exactly the same interface is guaranteed.

Another object of the invention is to provide a method of controlling a computer system in which each user is not required to be conscious of the physical location of an intended program or an intended file in executing the process using the file or the program in the computer system.

Still another object of the invention is to provide a method of controlling a computer system in which the place of executing a process in the computer system is dynamically determined from the property and the load of the process requested and the prevailing utilization rate of the computer system.

According to one aspect of the present invention, there is provided a method of controlling a computer system including a plurality of computers, comprising the steps of causing a specific computer A of the computer system to manage the computer resource information and the operating condition information on the CPUs, the files and memories of each computer of the computer system and the user resource information such as file data and programs, reporting the computer resource information and the user resource information from each computer to the specific computer A from time to time, reporting first to the computer A any log-in request which may be issued by a user from a computer C, returning the information for the particular user from the user resource information held by the computer A, and causing the computer C to display a list of files held by the user and usable programs as an interface on the display of the computer C in the computer system, thereby making it possible to invariably manage the user resources in the system regardless of the computer through which the user logs in to the system.

According to another aspect of the invention, there is provided a method of controlling a computer system, including the steps of transmitting a program from a computer A, allowing the program to patrol the computers connected to the network and detect a computer newly connected to the network, and transplanting to the newly detected computer the program for reporting the computer resource information and the user resource information to the computer A, so that the newly connected computer can use the resources of the computer system as a new computer member of the computer system.

According to still another aspect of the invention, there is provided a method of controlling a computer system, including the steps of causing a computer C to issue a request for a process using a file and a program in the computer system, sending the request first to a computer A, causing the computer A to determine a computer or a computer group for executing the particular process on the basis of the physical location of the file and the program and the computer resource information, transferring and executing the file or the program, if required, on the basis of the particular determination, reporting to the requesting computer C the termination of the process, and causing the computer that has executed the process to send the file and the program transferred thereto and any new file data generated as a result of the process to another computer, delete or report them to the computer A to the administration computer A of the computer system as a new user information resource of the computer, as required, thereby making it possible for the user to execute the requested process at an optimum place of execution without being conscious of the actual physical location of the file or the program.

According to this invention, there is provided a system including a plurality of computers interconnected through a network, in which the whole system can be used as a resource of each user. The data files and programs usable by each user in the system remain invariable regardless of a particular terminal from which the user logs in to the system, and the appearance (interface) is independent of the terminal. The user, therefore, is not required to use different methods for different terminals. Further, according to this invention, in the case where a user requests a process to the system including a terminal, the most efficient mode of executing the particular process is automatically determined by the system, and the resulting movement of the files and programs in the network is guaranteed by the system. All that is required of the user to do, therefore, is to request the process to a system. Also, since a file and a program are dynamically relocated taking the processing load of the whole system and the amount of movement in the network, an efficient utilization of the system is made possible. Further, in the case of any addition and connection of a new server, the file and the program thereof are automatically retrieved as a part of the system resources and are automatically allowed to be resident. The system can thus be expanded easily in keeping with the system load.

DESCRIPTION OF THE PREFERRED EMBODIMENTS

An embodiment of the present invention will be explained below with reference to FIGS. 1 to 18.

First, explanation will be made of a concept and a system configuration intended to be achieved by the invention with reference to FIG. 1, followed by the description of a detailed flow of each processing section.

Figure 1:
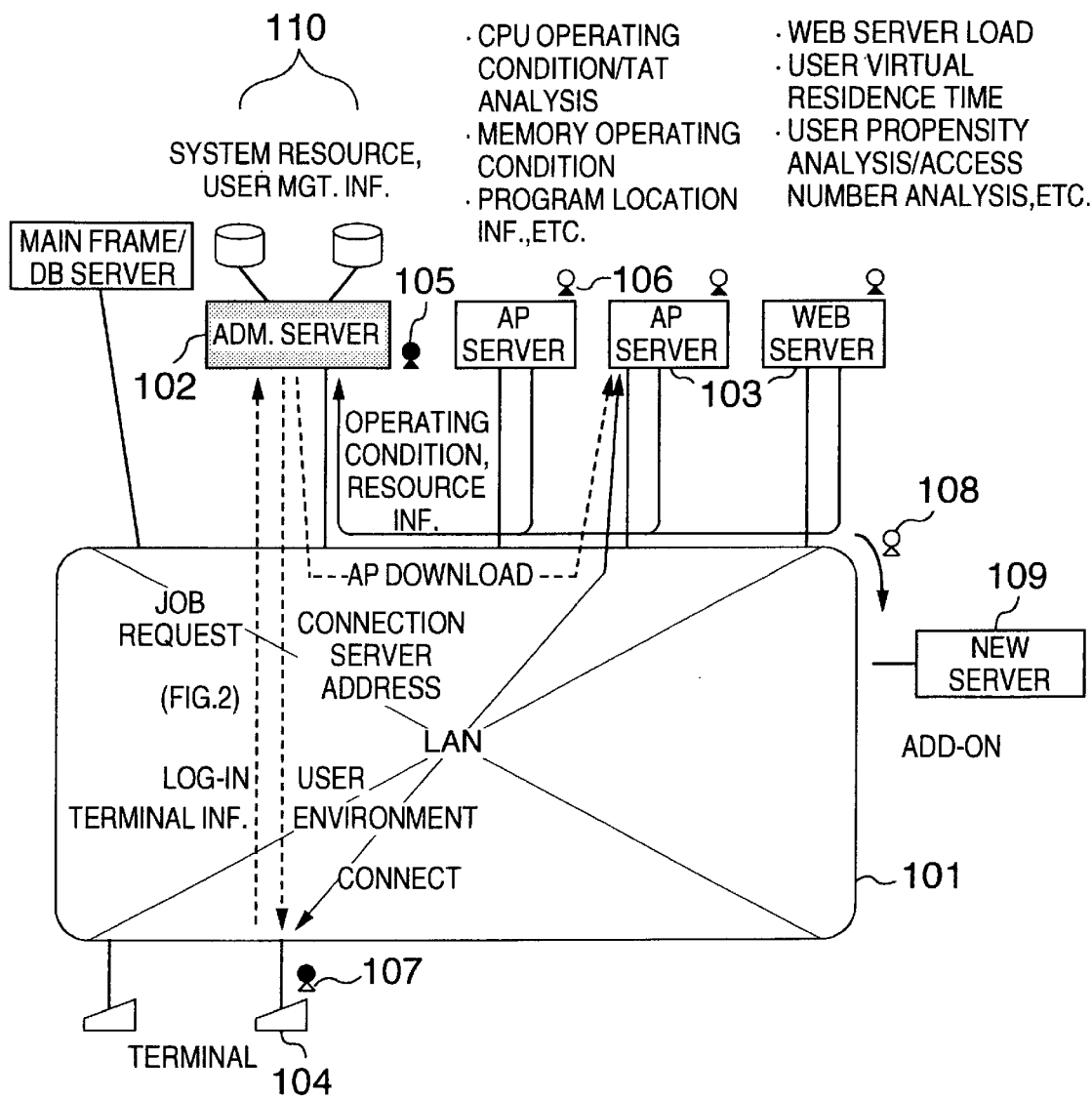
FIG. 1 is a diagram for explaining the concept of the present invention.

FIG. 1 shows an ordinary computer system including a plurality of computers interconnected by a network 101 to which the invention is applicable. The computers include at least a server shared by a multiplicity of users and a plurality of terminals 104 each occupied mainly by a single (not necessarily, specific) party. This system also includes an administration server 102 playing the central role in the invention. The administration server 102 is responsible for managing all the computer resources and all the jobs (the processing units of the computer) performed on the computers as well as the entire user information in the computer system.

First, the operation principle will be explained. All processing requests from the terminals 104 are provisionally sent automatically to the administration server 102. The administration server verifies the location of the program and the file corresponding to each processing request. Then, a computer (server or terminal) judged to be capable of handling a given process most efficiently is determined from the prevailing processing load of the servers in the network and the property and the location of the file and the program used for the intended process, and the place of execution of the process (connected server address) is notified to the particular terminal. In accordance with the information thus notified, the terminal requests a corresponding computer to execute the process. The movement of the file and the program, if required in advance, is the responsibility of the administration server. The user only requests the process, and the above-mentioned operations are automatically executed by the terminal, the administration server and the program (a unit of which is called an agent hereinafter) installed on the servers.

In order to realize this operation, the administration server 102 includes a system administration agent (program) 105, each server 103 includes a server management agent 106, and each terminal includes a terminal management agent 107, as a program. Also, a resource management agent 108 is available for transmission from the administration server.

The system administration agent 105 includes user management information, system resource management information and available application program information 110. The operating conditions and the resource management information of each server are received from the server management agent 106 to update the above-mentioned information. At the same time, the system administration agent 105 determines a computer and moves the file and the program in response to a process request sent from a terminal.

The server management agent 106 detects the resource management information (including the hardware resources such as the CPU, files and memories, and the software resources such as the user file data and the programs) of a server associated therewith, and transmits the information to the administration server 102. An arrangement is made to perform this detecting operation with the start or termination of a given job on the associated server as a motive.

The terminal management agent 107 detects the user information and the terminal information, and sends them to the administration server 102. Also, the terminal management agent 107 sends a processing request from the user to the administration server 102, and in compliance with an indication by the system administration agent 105 of a connected server address constituting the place of executing the particular process, connects the server and executes the process.

When a new server 109 is connected to the network, the resource management agent 108 is sent from the administration server 102 to the newly connected server 109, and a server management agent 106 is installed on the newly connected server 109. The new server can thus be made available as a part of the network system.

Figure 2:
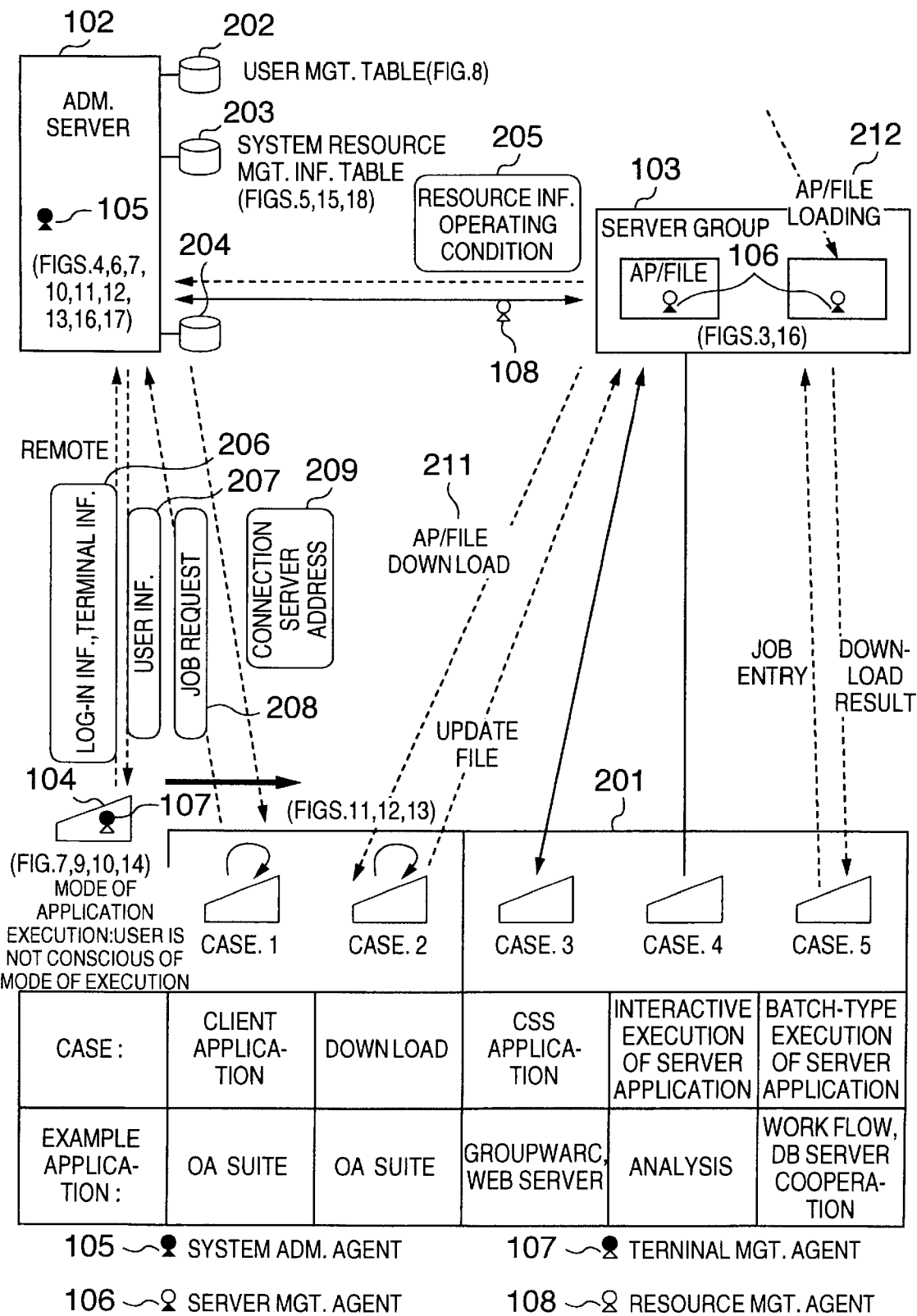
FIG. 2 shows a flow of the overall process.

Then, a detailed flow of the operation will be explained. FIG. 2 shows the overall flow of a more specific process and a detailed flow of the corresponding succeeding process.

First, a mechanism for collecting and managing the system resource information and the operating condition information of each server by the process of the system administration agent 105 and the server management agent 106 will be explained with reference to FIGS. 2 and 3 to 5.

In FIG. 2, the server management agent 106 resident in each of the servers 103 acquires the system resource information and the operating condition information of a particular server. These information 205 are sent to the administration server 102. The information thus sent are stored in a system resource management information file 203 by the system administration agent 105.

Figure 3:
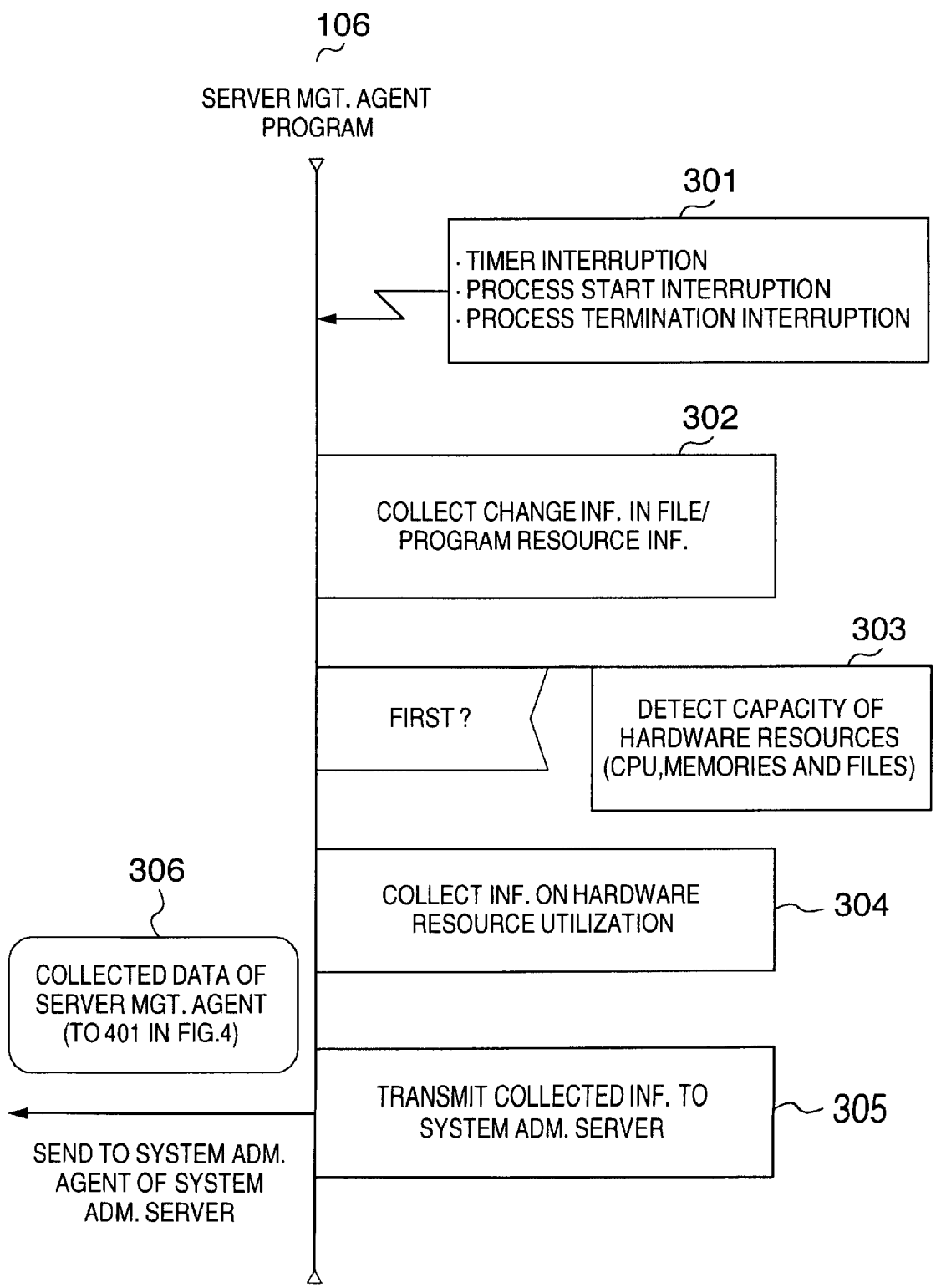
FIG. 3 shows a flow of the process for collecting the resource information of a server management agent program.

FIG. 3 shows an operation flow of a server management agent program 106. The server management agent starts the operation described below (301) in response to a timer interruption from an OS, a process start interruption or a process termination interruption by a program. First, the change information on the file and the program resource is collected (302). This can be realized by using the date and hour information generated or updated by an OS instruction. Then, the capability and the capacity of the hardware resources (CPU, memory and file) are detected only at the first time of detection of the server resource (303). This is static information, for which the first one detection session is sufficient, and can be realized also using the OS function. As the next step, the utilization information of the hardware resource is collected also using the OS function (304). The collected information will be described in detail later with reference to FIG. 5. The collected information is sent to the system administration server (305). The data 306 thus sent is processed as shown in FIG. 4.

Figure 4:
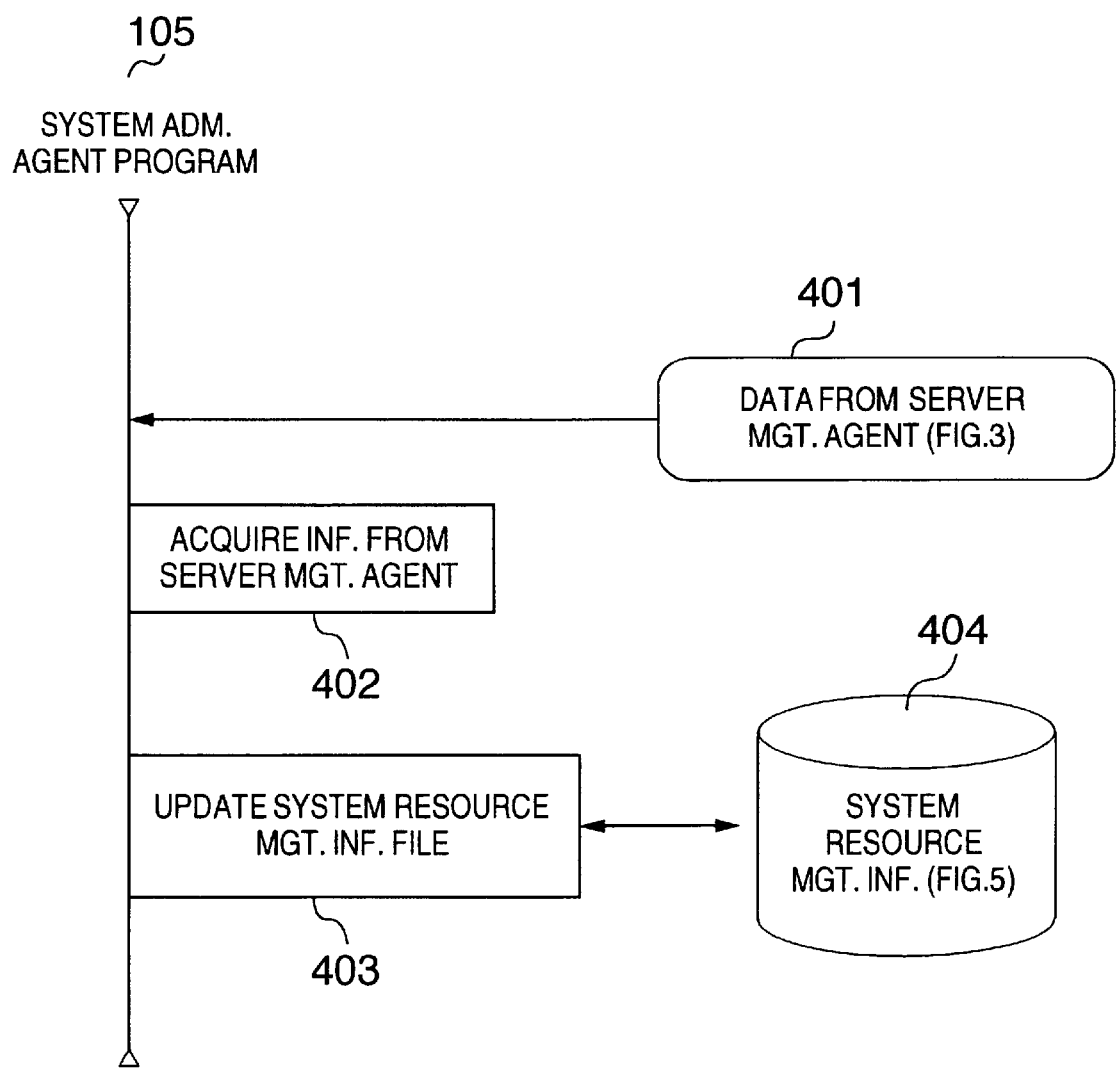
FIG. 4 shows a flow of the process for managing the server resource information of a system administration agent.
Figure 5:
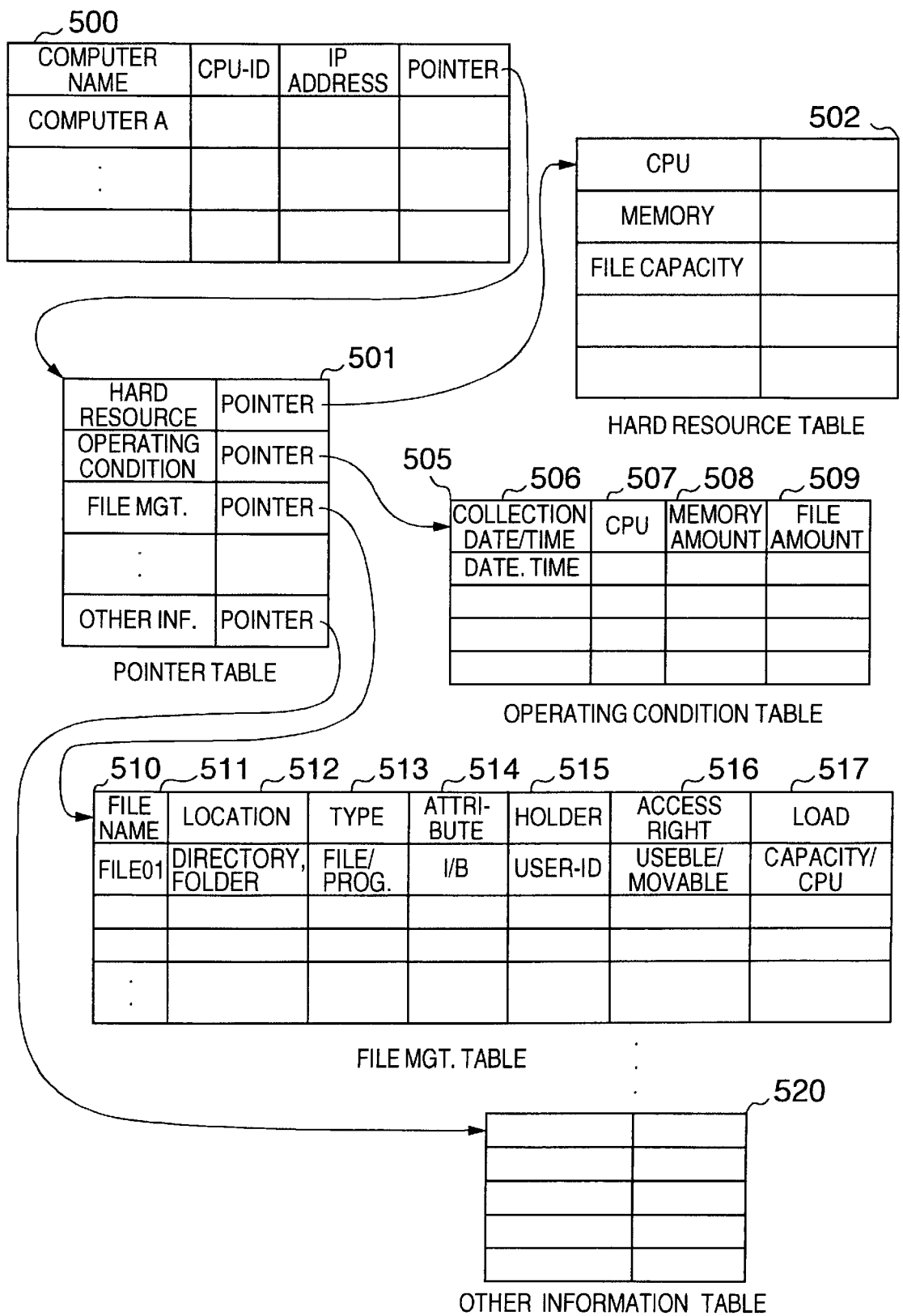
FIG. 5 is a diagram showing a structure of a system resource management table.

FIG. 4 shows a flow of the process for acquisition and management of the information 401 collected by the server management agent 106 in the system administration server 102. FIG. 5 shows a list of the information collected and managed and a storage file format. The system administration agent 105 acquires the information sent from the server management agent 106 (402). In accordance with the information thus acquired, the contents of the system resource management information file (FIG. 5) are updated (403).

The header 500 of the system resource management information table 203 shown in FIG. 5 has such information as a name for specifying an individual server computer, a CPU-ID for specifying a computer, and an IP (internet protocol) address in the system network. The header is linked by a pointer to a table having more detailed information. This pointer indicates a pointer table 501 having other pointers indicating a plurality of subtables having classified storage information. The subtables include a hard resource table 502 indicating the resources on the computer hardware, an operating condition table 505 for recording the operating conditions of the hard resources at each time point, and a file management table 510 for recording the information stored in the files on the server. Other information 520 can also be managed by a subtable having the same form linked from this pointer table whenever required.

The hard resource table 502 contains basically static information in the absence of any change or addition of the hardware which is collected in step 303 in FIG. 3. The operating condition table 505 is for recording the operating conditions of the hardware at the time of the interruption of step 301 in FIG. 3 and collected with the same interruption as a motive. This operating condition table 505 has stored therein the date and hour of collection 506, the CPU utilization 507, the memory utilization 508 and the file utilization 509. The file management table 510 has stored therein a file name 511, a location 512 such as the directory name and the folder name, a type 513 indicating a file data or a program, an attribute 514 indicating an interactive execution (I) or a batch-type execution (B) for a program, a user ID 515 indicating the holder of the file, an access right 516 indicating the scope of utilization of file copies and by other users, and a load amount 517 indicating a file capacity or, in the case of a program, a CPU power and a memory required for executing the program, with respect to the information stored in the file of a particular server.

As a result, the hardware resources and the software resources owned by each server are managed and so are the operating condition information at each time point. The data 306 sent from each server management agent shown in FIG. 3 can have the same format as this table or can be in a format compressed to contain only the sampled and updated information.

The embodiment of FIG. 3 shows the case in which the information is collected in the same manner for the timer interruption, the process start interruption and the process termination interruption. The sampled data, however, can be specified for one of the subtables of FIG. 5 in accordance with the type of interruption. As to the timer interruption, for example, a modification can be employed in which only the information corresponding to the operating condition table 505 is sampled.

Returning to FIG. 2, a method of realizing the user operability independent of the log-in terminal or the registration of the user management information by the system administration agent 105 and the terminal management information 107 will be explained with reference to FIGS. 2 and 6 to 9.

In FIG. 2, when the user logs in to the system, the terminal management agent 107 sends to the administration server 102 the log-in information and the terminal information 206 used for the log-in. The system administration agent 105 on the administration server 102 accesses the user management information 202 (FIG. 8) to process the log-in. At the same time, the user information 207 constituting a list of available programs and the file information owned by the user for the entire network system is returned to the terminal management agent 107. The terminal management agent 107, using the particular information, displays the user interface (FIG. 9) remaining unchanged regardless of the terminal from which to log in and thus supports the user operation.

Figure 6:
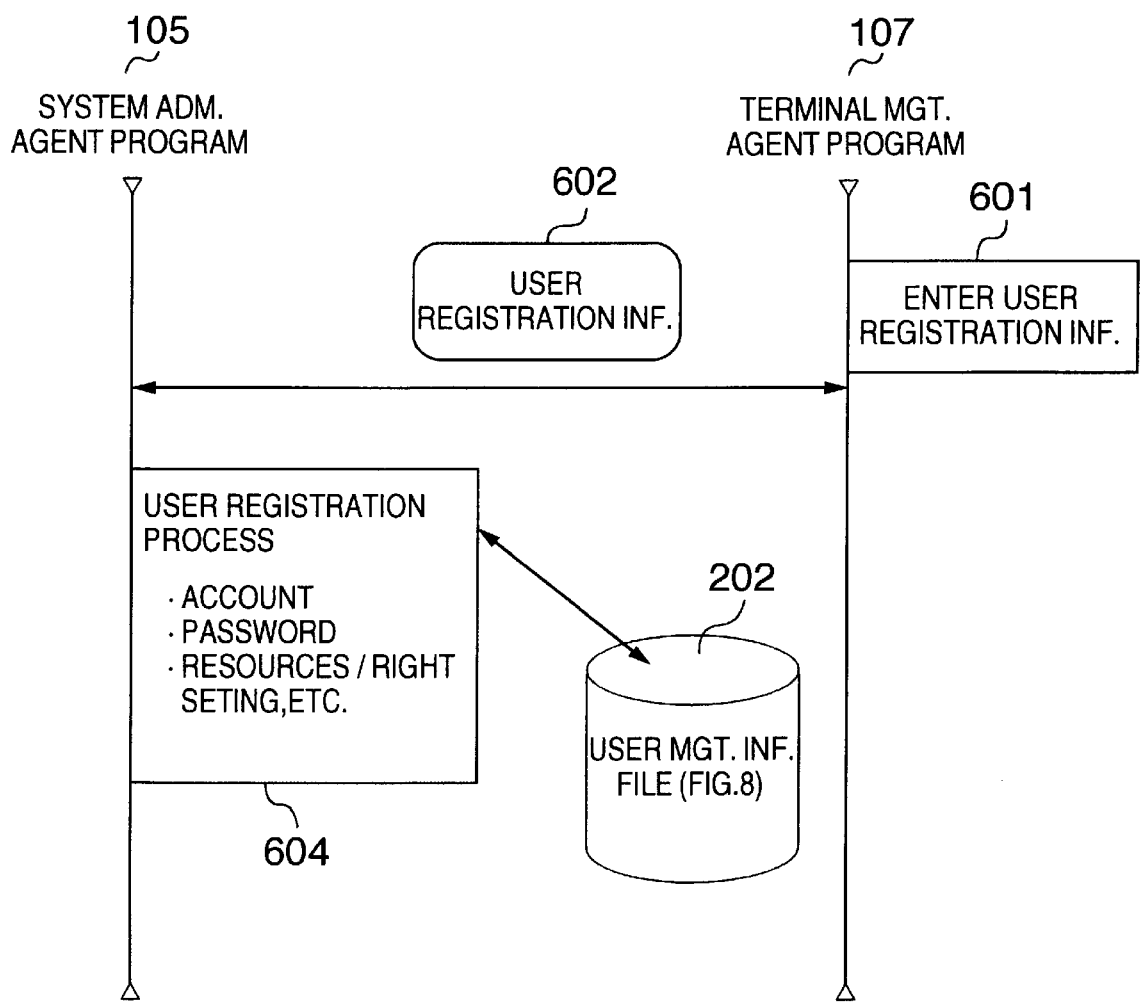
FIG. 6 shows a flow for registration of a user in the system.

FIG. 6 is a flowchart showing the operation performed by a user for registering in the system for the first time. First, the user registration information 602 is entered by way of the terminal (601). This process can be normally operated only from a specific user (system manager or the like) or a specific terminal determined by the system. The system administration agent 105 sets an account and a password and registers the user resources such as a file in the user management file (FIG. 8) on the basis of the user registration information (604). After that, the user can log in to the system by the process shown in FIG. 7 in the capacity of a system user.

Figure 7:
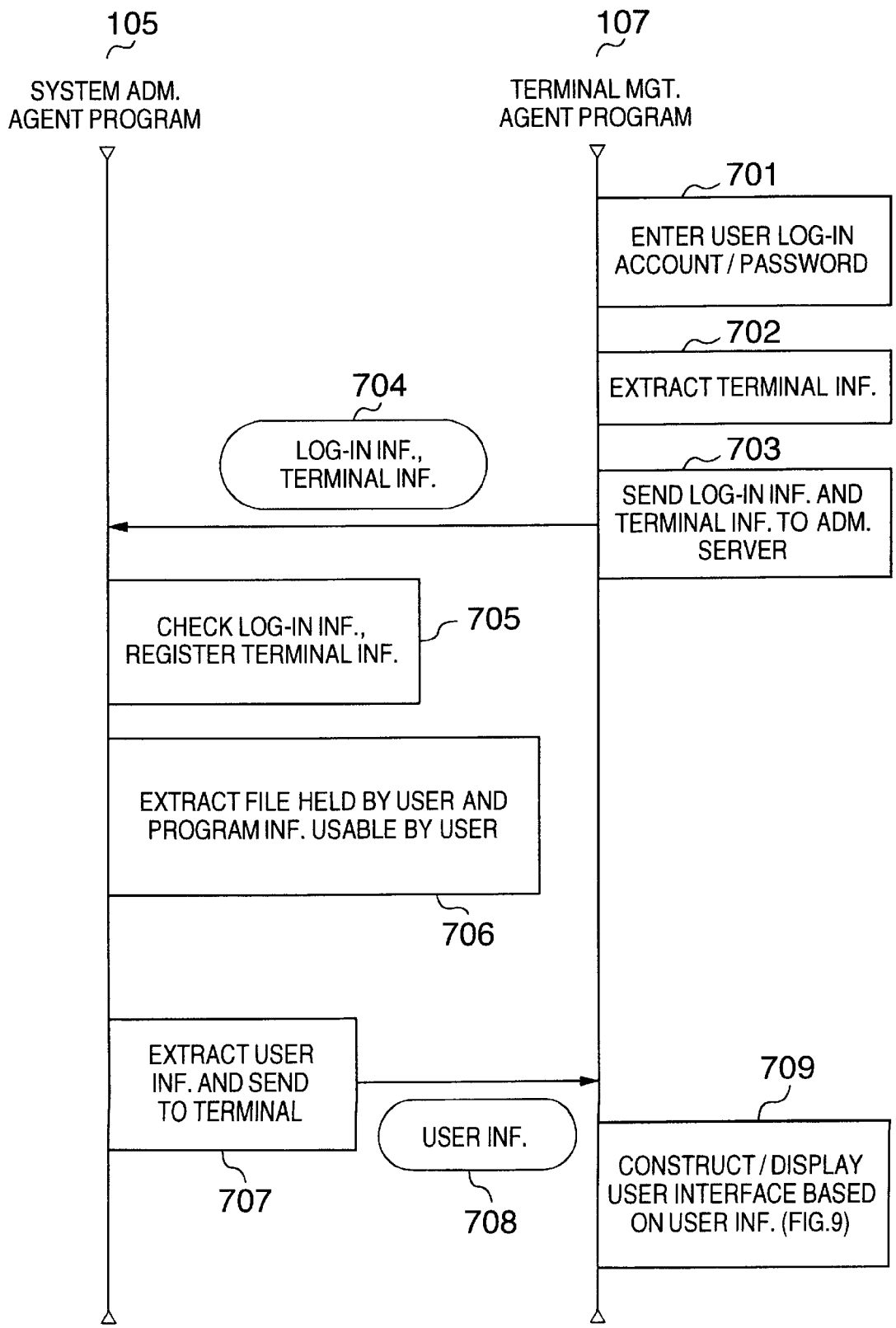
FIG. 7 shows a flow of the process executed by a terminal management agent for logging in to the system.

FIG. 7 shows a flowchart for the log-in operation performed by a user through the terminal management agent 107. First, an account and a password are input as the user log-in information (701). Then, the terminal management agent program extracts the terminal information used for the log-in (702). The terminal information is stored in a log-in terminal management table 809 of FIG. 8. The extracted log-in information and the terminal information 704 are sent to the system administration agent 105 of the system administration server (703).

The contents of the table of the user management information file (202 in FIG. 2) will be explained with reference to FIG. 8. The user management information table is constructed as a hierarchy table having a header (800) constituting a list of individual user IDs and corresponding passwords, and is linked further to a detailed information table by a pointer. This pointer indicates a pointer table 801 having a plurality of pointers for further indicating a plurality of subtables containing classified storage information. Each of the subtables includes a user management table 802 describing the right of the user to use the system, the charge rate, the total amount and upper limit of the charge, a user resource file management table 803 indicating a list of files owned or usable by the user in the whole internal area of the network system, and a log-in terminal management table 809 containing information associated with the terminal used by the user for logging in to the system. Other information is also managed in a subtable 820 of the same type linked from this pointer table. The user resource file management table contains only the information accessible by the user extracted from the file management table 510 of FIG. 5. The information included are limited to a file name 804, a location 805, a type 806 and an attribute 807. The log-in terminal management table 809 contains a log-in terminal IP address, a CPU performance representing the capability as a terminal computer, a memory capacity (absolute capacity and actual amount used), a file capacity, a display capacity (screen size, display colors, etc.), and a pointer indicating a resource file table locally owned by the terminal. The terminal resource file management table 810 holds the information of the same type as the file management table 510 shown in FIG. 5.

Figure 8:
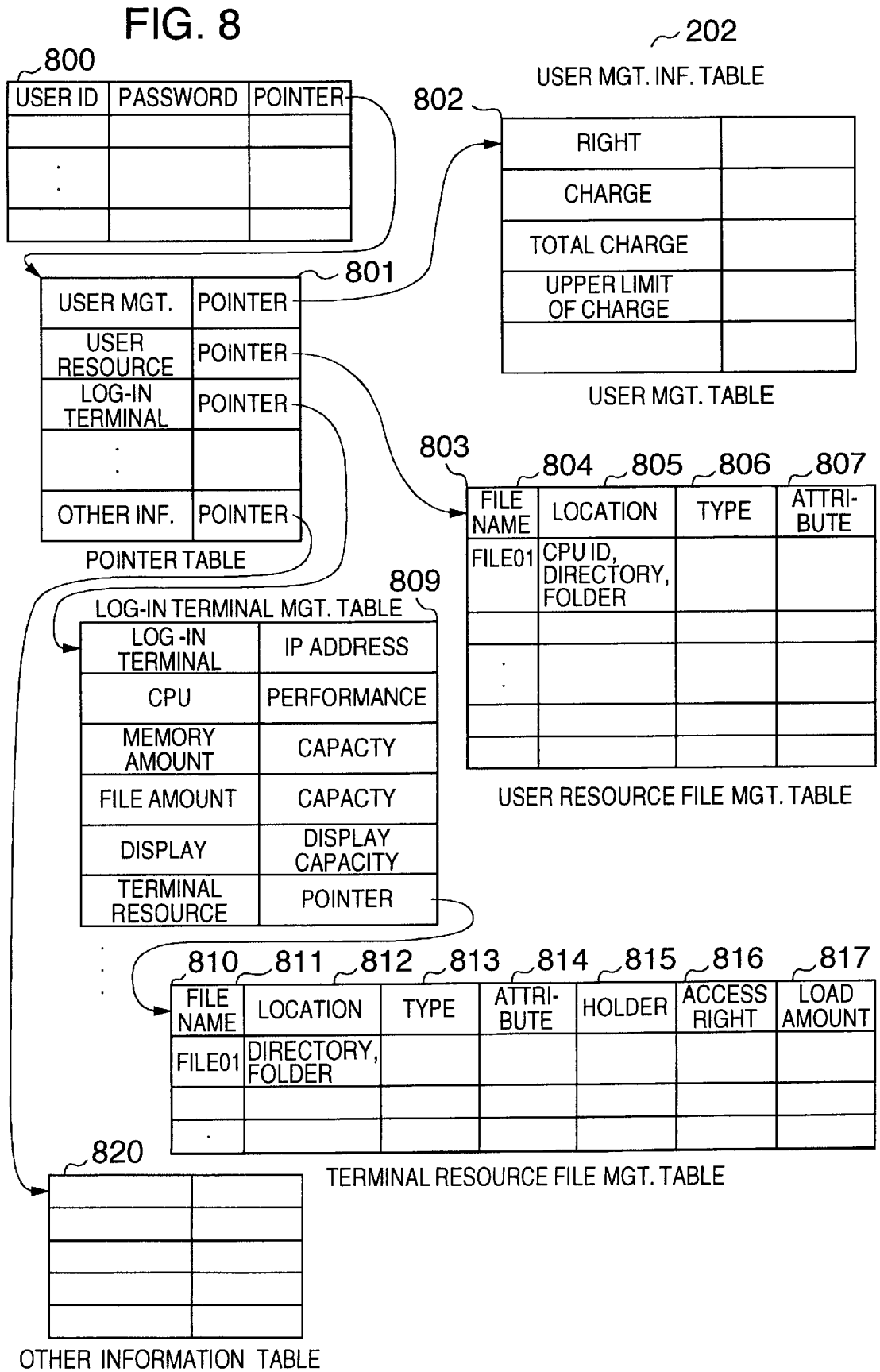
FIG. 8 is a diagram showing a structure of a user management table.

Returning to FIG. 7, the log-in information is checked using the tables of FIG. 8 on the basis of the information sent from the terminal, and the terminal information is registered (specifically, the tables 801, 809 and 810 shown in FIG. 8 are generated) (705). Though not shown here, any error or shortage of the registered information is reported to the terminal, in which case the subsequent operation is suspended. Then, a file (including a program) owned by the user or the file available for use by the user is extracted (706). This operation is performed following the header 800 of the user management file and the pointer table 801 shown in FIG. 8 and referencing the table 803. As the next step, the user information thus extracted is sent to the terminal (707). Using the user information 708 thus sent thereto, the terminal management agent constructs and displays a user interface not dependent on the terminal in use (709).

Figure 9:
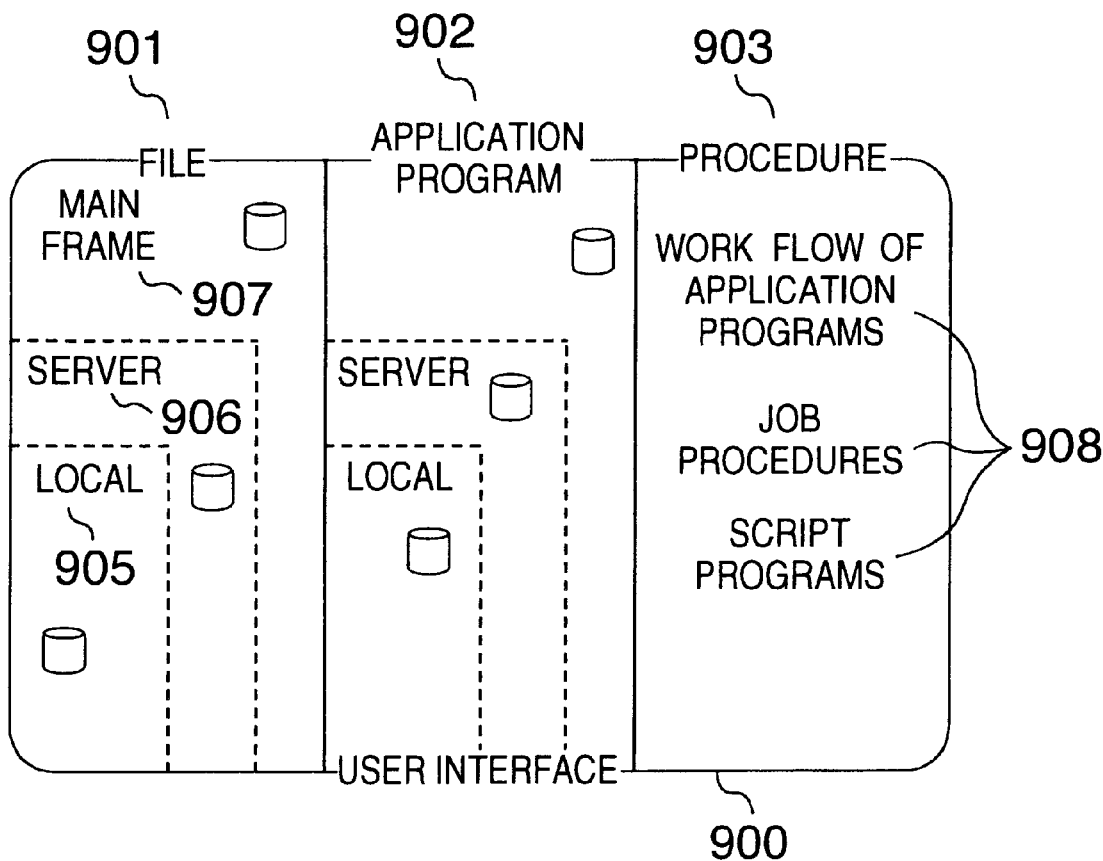
FIG. 9 is an example of a user interface not dependent on the terminal.

An embodiment of a user interface assumed to be independent of a terminal is shown in FIG. 9. The conventional user interface is dependent to a large measure on the terminal used in that the information is displayed uniquely dependent on the window of the operating system installed for each terminal and in that the user resources existing in the network system other than the particular terminal are not displayed or, if displayed, in a different window using a specific command or the like. The interface according to the present invention, on the other hand, has a feature in that the user resources for the entire network system including a terminal are displayed independently of the particular terminal. All the files owned by the user and all the programs available for use by the user in the network system can be extracted by reference to the user management information table (FIG. 8) described above, and are sent to the terminal management agent from the system administration agent as the user information 708 shown in FIG. 7. A file locally owned by the terminal, which can also be referenced to the table 810 in FIG. 8, is originally sent from the terminal and located at the terminal. As a result, all the information on the files and the programs available for use when a process is executed in the system using a terminal is held by the terminal management agent. A user giving an instruction to the computer designates a file (data) used, a program constituting a unit of processing and a procedure indicating the sequence of processing. These information are classified into a file 901, a program (application program) 902 and procedure 903 and displayed by a common display means (such as icons) as shown in FIG. 9. However, the user is not required to be conscious of the physical location of the file, and therefore the information is displayed in a logical name attached by the user. The dashed lines of FIG. 9, therefore, are not displayed. For the user desirous of being conscious of the presence of the file, however, the hierarchical positions of the terminal (local), the server and main frame (back-end server) are specified in the windows as indicated by 905, 906, 907, so that an icon of a corresponding file is displayed within each area defined by the dashed lines. This is also the case with the program. A procedure, on the other hand, can be displayed as indicated by 908 in a subwindow by icons making up tools capable of describing the processing steps by combination of a file and a program, which icons are appropriately selected for prompting a detailed description. The user designates a process using this interface. As seen from the foregoing description, no information unique to a terminal or the system is used at all for constructing a screen. No matter which terminal the system is logged in from, therefore, a common user interface can be displayed. Now, explanation will be made about how the process designated by using this interface is interpreted by the terminal management agent and how to realize an actual process.

Returning to FIG. 2 again, a method of determining the place of executing the process at the administration management server 102 in accordance with a request made from the terminal through the terminal management agent 107, constituting another process of the system administration agent 105 and the terminal management agent 107, and a method of executing the process based on such a determination, will be explained with reference to FIGS. 2 and 10 to 15.

First, a flow of the process will be briefly described with reference to FIG. 2. When a job request 208 is sent from a terminal through the above-mentioned interface to the administration server 102, the system administration agent 105 detects the physical location of the file and the program using the information contained in the user management information table 202 and the system resource management information table 203. Further, in executing the process, a computer (server or terminal) considered the most appropriate for the whole system is determined, and a connection server address is sent to the terminal accordingly. Also, if required, the file and the program are loaded by the system administration agent 105 (211, 212). The terminal management agent 107 requests the process to the connection server (including the terminal). Actually, however, the process, which is executed in one of the forms 201 shown in FIG. 2, is transparent to the user.

Figure 10:
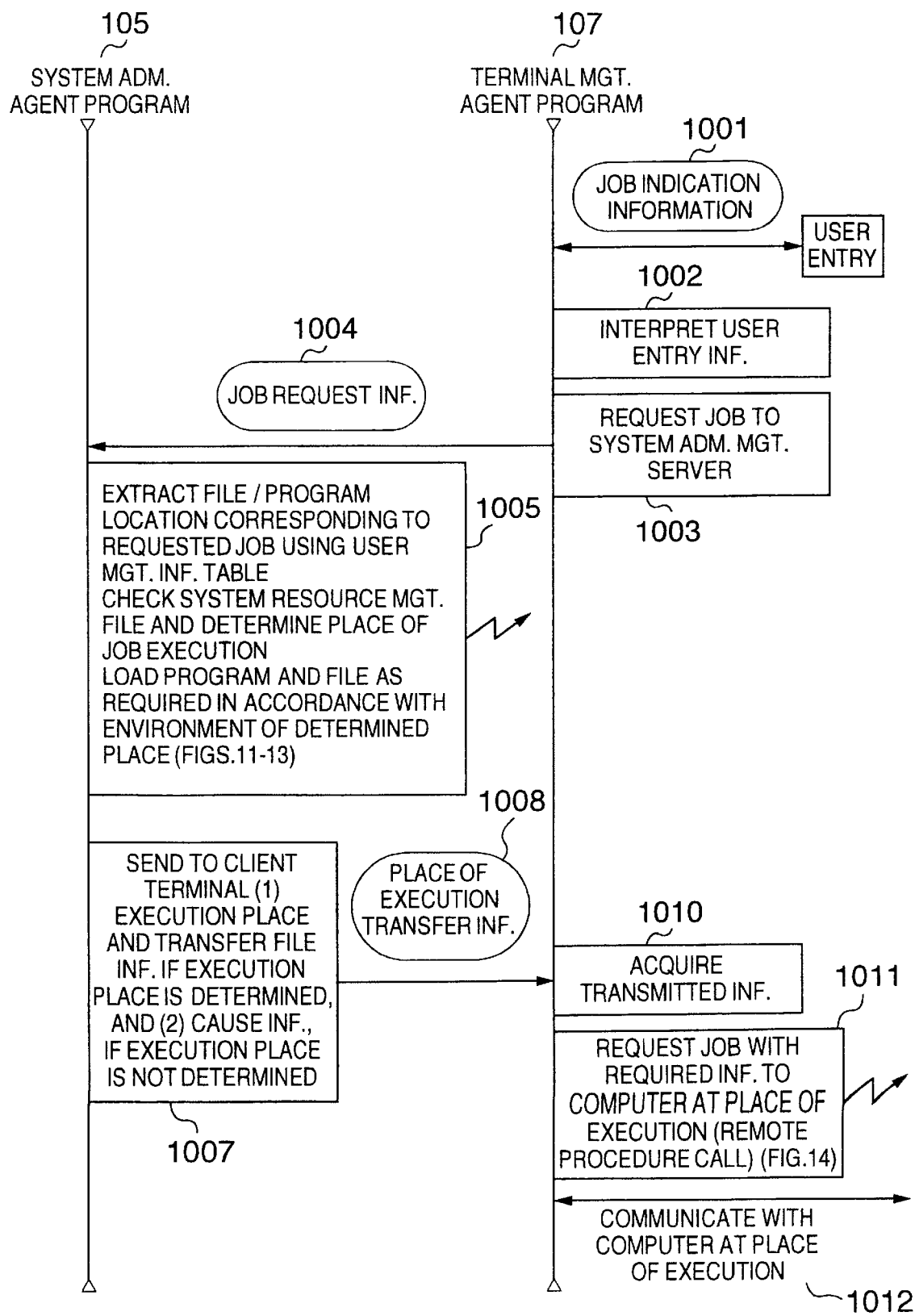
FIG. 10 shows a flow for communication between the system administration agent and the terminal management agent.

Now, a flow of operation for determining the place of executing a process will be explained with reference to FIG. 10. The job indication information 1001 input from the user through the above-mentioned interface is interpreted into an actual file name or an actual program name by the terminal management agent 107 (1002), and transmitted as a job request to the system administration server (1003). The system administration agent performs the following process 1005 based on the job request information 1004. The location of the file/program corresponding to the requested job is extracted using the user management information table 202. The place of execution of the particular job is determined with reference to the system resource management information file 203. At the same time, as required from the environment of the place of execution, the program and the file are loaded into the computer at the place of execution. The flow of operation of the process 1005 will be explained in detail with reference to FIGS. 11 to 13.

Figure 11:
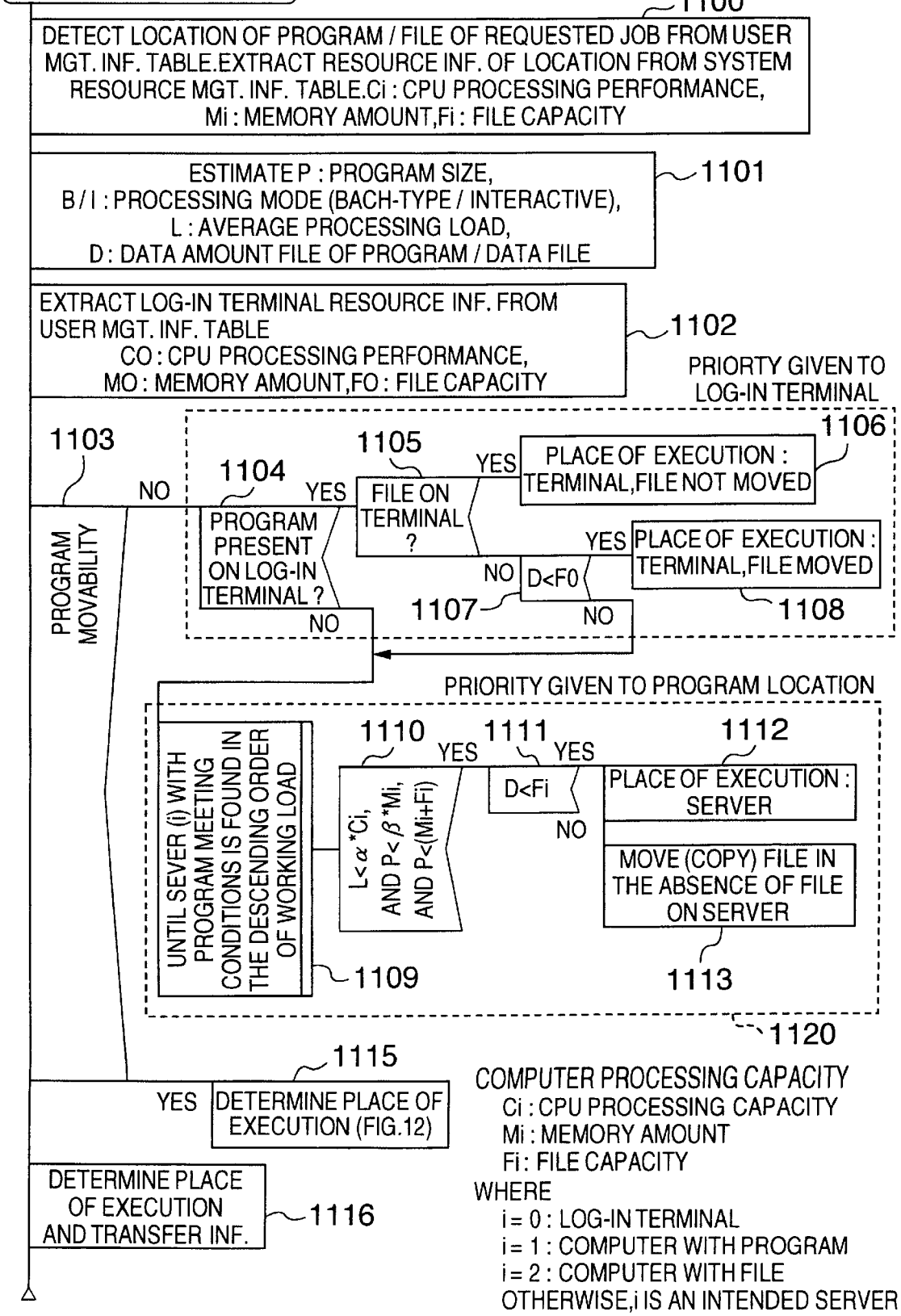
FIG. 11 is a flowchart for determining a place of executing a job requested by a terminal.
Figure 12:
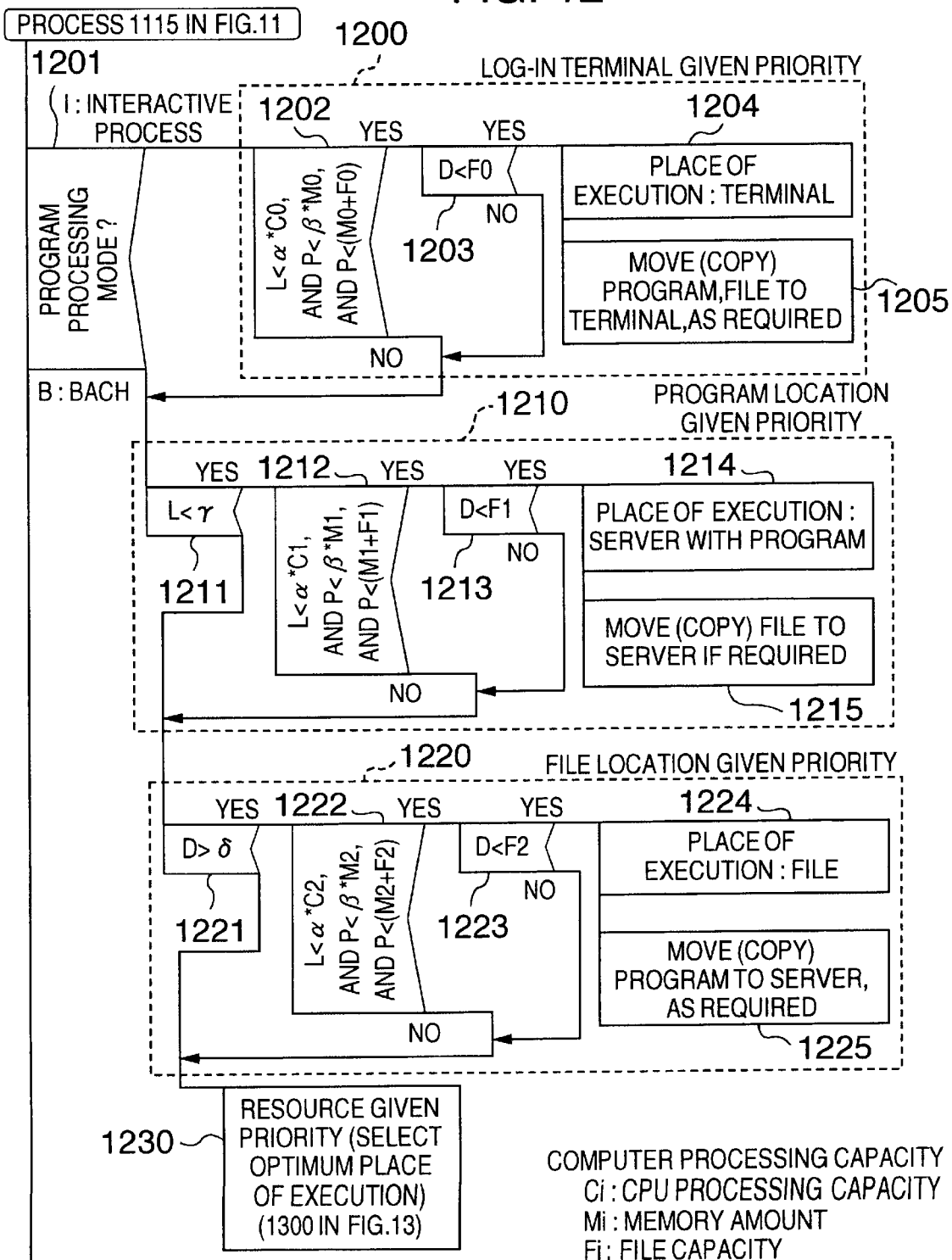
FIG. 12 is a flowchart for determining a place of executing a job requested by a terminal.

In the flowchart of FIG. 11, first, the location of the program/file of the requested job is detected from the user management information table 202, and using this location, the CPU processing performance Ci, the memory capacity Mi and the file capacity Fi are extracted as the resource information of the location with reference to the system resource management information table 203 (1100). This can be accomplished by referring to the field 805 describing the location in FIG. 8 and then the field 510 in FIG. 5 accordingly. Assuming that there are a plurality of locations, a prefix i is used. Then, the system administration agent 105 extracts a program size (P) indicating the memory capacity required for execution, a processing mode indicating the batch-type process B or the interactive process I, and an average processing load (L) for the program to be executed. Then, the data file amount (D) for a file to be processed is extracted (1101). If a program/file on the server is involved, the fields 513, 517 in the table 510 of FIG. 5 are referred to, while in the case of a terminal user resource, the fields 813, 817 in the table 810 of FIG. 8 are referred to. Then, the log-in terminal resource information including the CPU processing performance CO, the memory capacity MO and the file capacity FO are extracted from the user management information table 202 (FIG. 8) (1102). This can be accomplished by reference to the table 809 in FIG. 8. The processing load is assumed to be the total processing amount, and the CPU processing performance as the processing amount per unit time.

The place of job execution is determined in accordance with the following algorithm using these information.

First, two modes are involved depending on the possibility of moving the program (1103). In the case where a program execution agreement specifies (fixes) a computer to be used for execution, the program cannot be moved.

In the case where the movement is prohibited, the possibility of execution at a log-in terminal is checked in the presence of the program on the log-in terminal (1104). If the file to be processed is existent on the terminal (1105), the terminal is determined as the place of execution and the file need not be moved (1106). In the case where there is no file to be processed on the terminal (where the judgement in 1105 is NO), on the other hand, the possibility of moving the processing file to the terminal is checked (judged in step 1107 on the basis of whether the capacity D of the filed to be processed is smaller than the file capacity FO of the terminal). If the movement is possible, the file is moved with the place of execution as a terminal (1108). In the case where the movement is impossible (in the case where the judgement in step 1107 is NO) or in the absence of a program on the terminal (in the case where the judgement in step 1104 is NO), on the other hand, the process proceeds to the next step for studying the execution of the program at another location.

Until a server satisfying the conditions is found by tracking the servers (i) having a program in the ascending order of the processing load, the process described below is repeated (1109). The information on the working load for the server having the particular program can be determined by referring to the operating condition table 505 of the system resource management information table 203 in FIG. 5. The servers can be selected, for example, in the descending order of the absolute value of the margin of the CPU processing capacity. The margin can be determined by subtracting the latest value of 507 from the absolute capacity of 502. Each server to be processed is checked as to whether it has a sufficient processing capacity (1110). To assure a sufficient processing capacity, the conditions described below are imposed on the CPU capacity and the memory capacity according to this embodiment. Specifically, it is determined whether the CPU capacity Ci is not less than a certain level (L<α*Ci) for an assumed processing load L, whether the memory capacity Mi on the server is not less than a certain proportion (P<β*Mi) of the memory size P required for program execution, and whether the memory capacity including the file is sufficient (P<(Mi+Fi) assuming that the file is used for virtual storage, where α and β are given constants. These values, however, are determined in such a manner that the processing time is not extremely lengthened. In view of this, α and β are set to 10 and 0.5, respectively, for example. Once these conditions are met (1110), whether the processing file can be stored on the server (D<Fi) is checked (1111). If such storage is possible, the particular server is determined as the place of execution (1112), and in the absence of the processing file on the server, the file is moved (copied) (1113). Otherwise, the next server candidate is checked.

In the case where the program can be moved, a priority place of execution (location of the terminal, or the program/file) is determined in accordance with the processing property and the amount of the program to be processed and the file capacity. An actual place of execution is thus determined while applying the conditions for judgement described above (1115). The flow of this operation will be described below with reference to FIG. 12.

Figure 18:
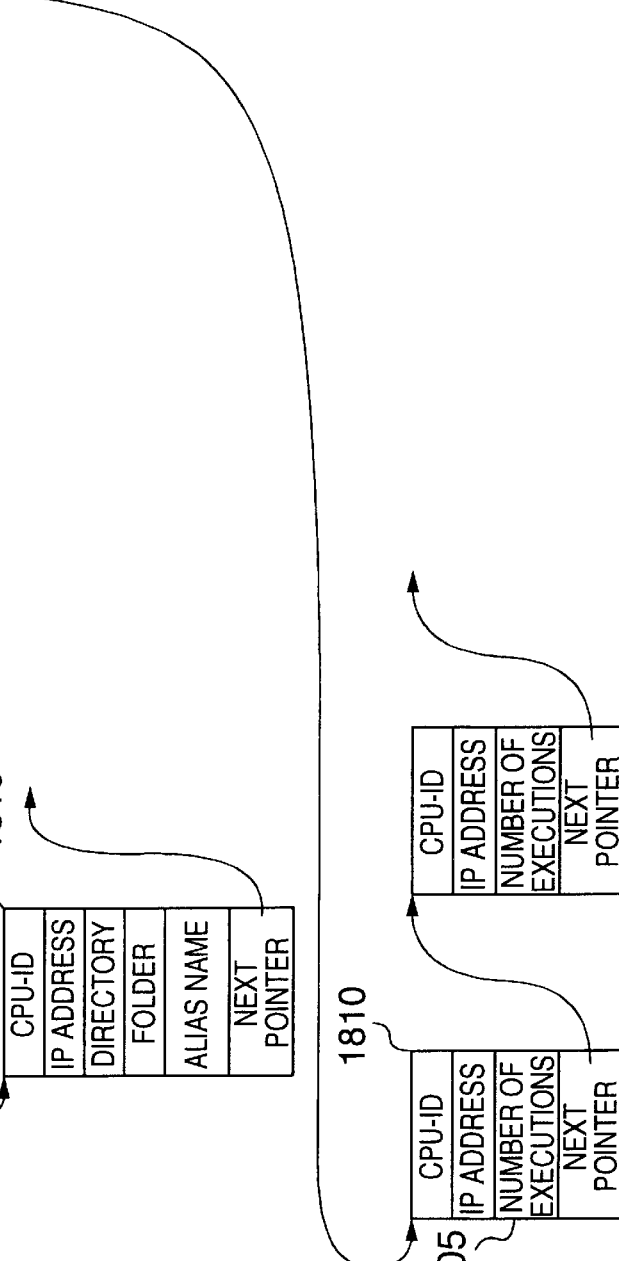
FIG. 18 is a diagram showing a structure of an expanded file management table.

The process for monitoring the movement of the program and file can be executed as a part of the process 1116 for registering the place of execution 1802 with reference to the table of FIG. 18.

In the case where the program processing mode is interactive, the terminal is determined as a place of execution in priority and whether the processing is possible or not is checked (1200). This is by reason of the policy of executing the processing at a place as near to the user as possible to maintain the performance of frequent interactive operations. In the case of interactive process, the possibility of execution on the log-in terminal is checked (1202 to 1205). This is accomplished with exactly the same algorithm as the process of 1110 to 1113. If execution on the log-in terminal is possible, the program and/or file is moved (copied) to the terminal as required. In the case where the execution on the log-in terminal is impossible due to the limitation of the CPU performance or the file capacity, in contrast, or in the case of batch-type processing, the steps described below are followed.

First, in the case where the absolute value of the processing load of an intended program is not more than a predetermined processing amount γ, for example, the possibility of execution is checked assuming the location of the program as a priority place of execution (1210). The processing amount γ is determined in advance, for example, as an assumed total processing amount of 10 billion instructions. This is in view of the policy of selecting a place of execution having a large processing capacity for a process larger than a predetermined level, while in the case of a process involving a smaller capacity, however, the possibility of execution at the program location is checked (1212 to 1215). This is accomplished by exactly the same algorithm as the process 1110 to 1113 in FIG. 11. In the case where this execution is possible, the program and file are moved (copied) to the server at the place of execution determined in the above-mentioned manner. In the case where there are a plurality of program locations, this process is repeated as many times as the locations until the place of execution is determined.

In the case where the data amount (D) of the file to be processed is a given size δ or more, on the other hand, the possibility of execution is checked with the file location as a priority candidate of the place of execution (1220). The given size δ is predetermined at, say, 3 Mbytes. This is by reason of the policy to avoid the movement of a large-scale data base or the like through the network. In the case where the data amount (D) of the file to be processed is not less than the given size δ (1221), on the other hand, the possibility of execution at the file location is checked (1222 to 1225). For this purpose, as in the preceding case, exactly the same algorithm as the steps 1110 to 1113 of FIG. 11 is used. If the execution is possible, the program is moved (copied) to the server at the place of execution determined, as required. In view of the fact that the file is already located on the server, however, the condition judgement 1223 for the file capacity is always YES. When there are a plurality of file locations, this process is repeated as many times as the number of such locations until the place of execution is determined.

In the case where the place of execution fails to be determined as a result of the judgement conducted so far, a place of execution most suitable from the viewpoint of the resources is determined from among all the servers included in the network.

Figure 13:
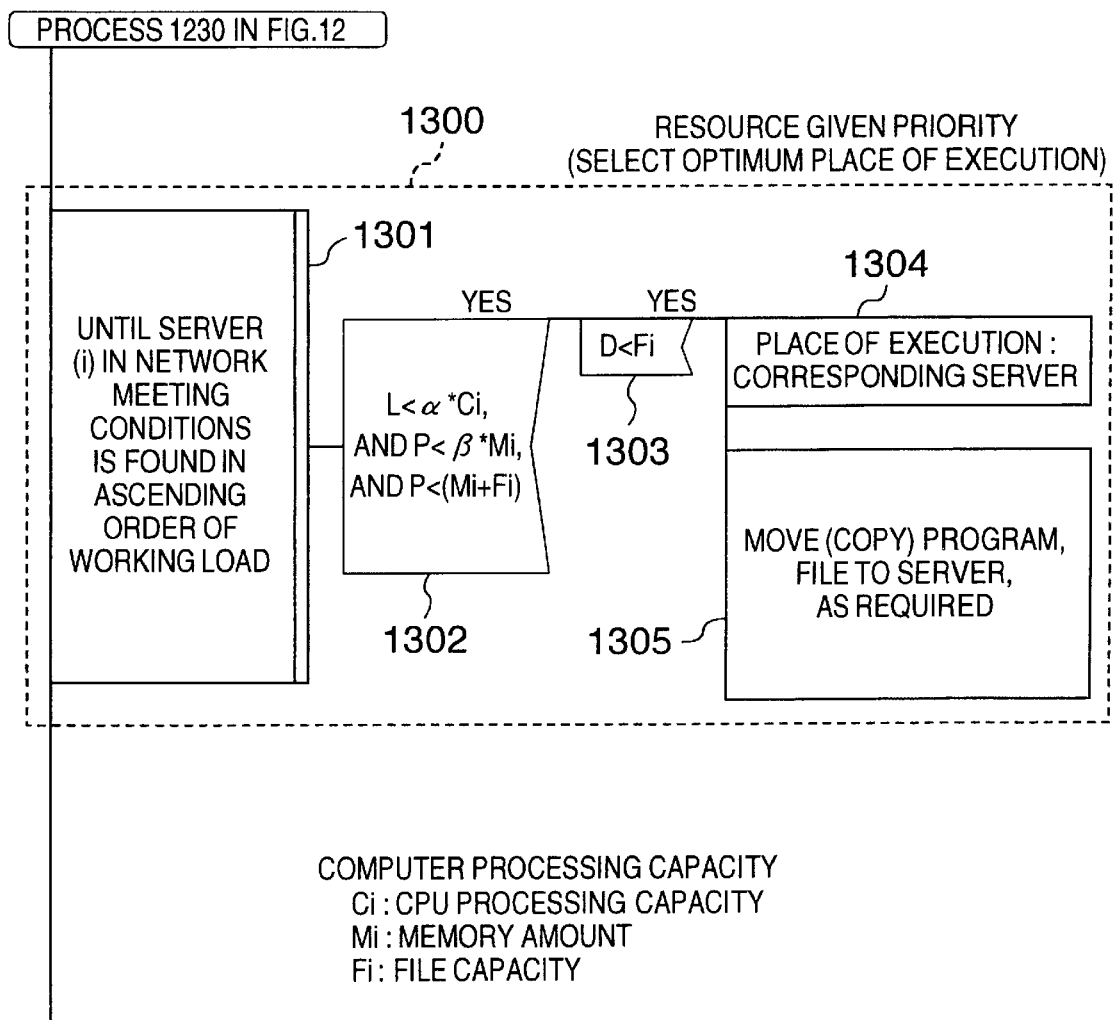
FIG. 13 is a flowchart for determining a place of executing a job requested by a terminal.

In FIG. 13, the process described below is repeated (1301) until a server satisfying the conditions is found in the ascending order of the operating load among the servers (i) in the network. The information on the lightweight of the operating load, like in the process at 1109 of FIG. 11, can be known by reference to the operating condition table 505 of the system resource management information table shown in FIG. 5. For example, the absolute values of the remainders of the CPU processing capacity are selected in the descending order, in which the remainder can be determined by subtracting the latest value of the CPU load 507 from the absolute capacity of 502. As an alternative, the latest average load amount can be used instead of the latest load. The possibility of execution is checked in the order of servers selected (1302 to 1305). This is accomplished by exactly the same algorithm as the steps 1110 to 1113 in FIG. 11 in the preceding case. In the case where the execution is possible, the program and file are moved (copied) to the server at the place of execution as required.

A detailed flow of operation performed by the system administration agent 105 was described above for determining the place of executing the job requested from the terminal.

Returning to FIG. 10, once the place of execution is determined by the above-mentioned algorithm, the place of execution and the information on the file moved are sent to the terminal, while such algorithm fails to be determined, on the other hand, the cause thereof is sent to the terminal (1007). As the information of 1008, the CPU-ID and the IP address are sent for the place of execution, and the CPU-ID and the IP address of the origin of the program or file is sent for file movement. The terminal management agent 107 that has acquired the transmission information at step 1010 requests a job to the computer at the place of execution on the basis of such information (1011), and communicates with the computer at the place of execution in accordance with the job contents. A detailed flow of the process performed by the terminal management agent will be explained below with reference to FIG. 14.

Figure 14:
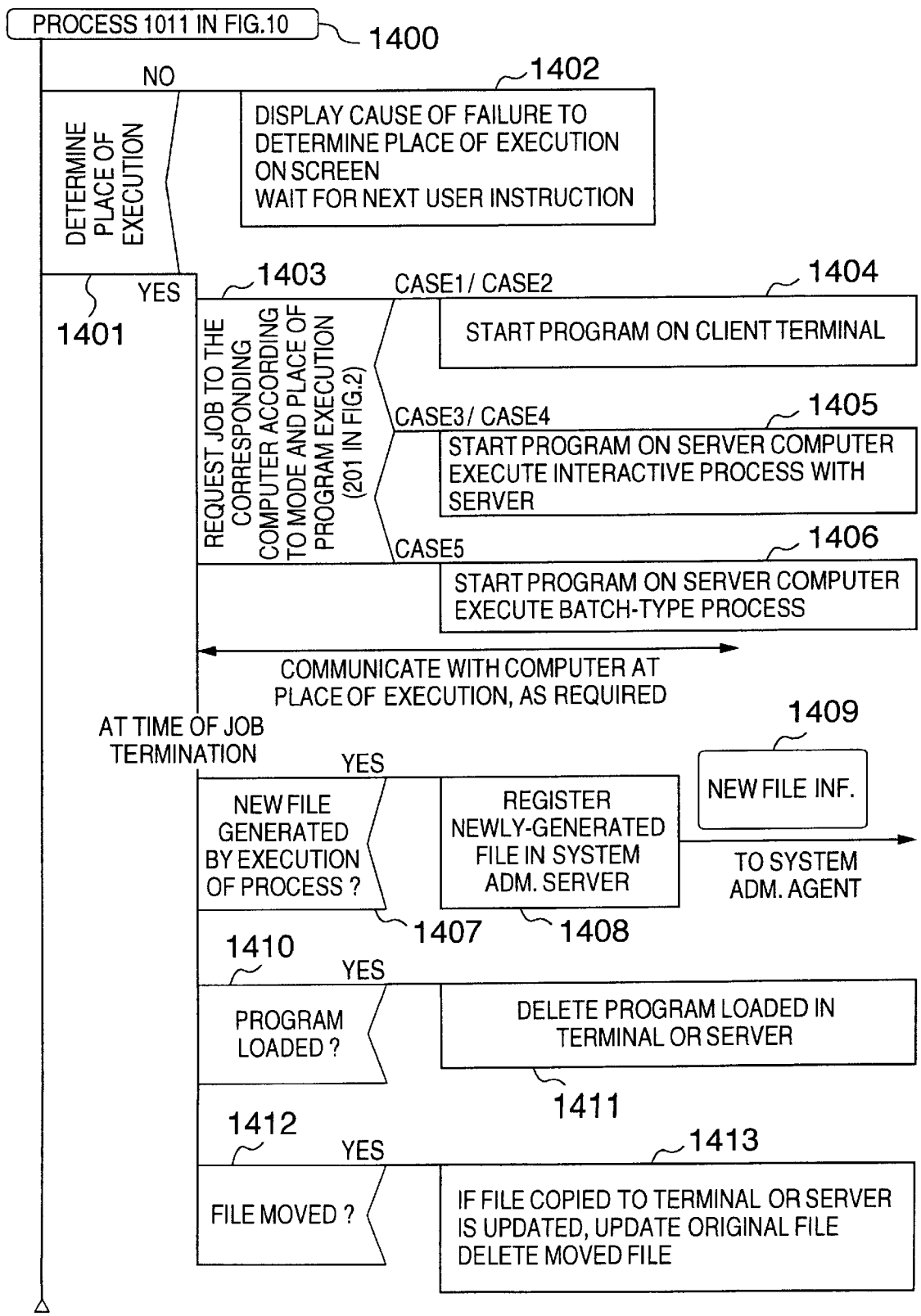
FIG. 14 is a flowchart for requesting a process from a terminal management agent to a computer at the place of execution.

In FIG. 14, in the case where the place of execution fails to be determined (1401), the cause of failure to determine the place of execution is displayed on the screen waiting for the next instruction from the user (1402). The probable cause of failure to so determine is an insufficient resource at a specified server at the program location for an immovable program, or an insufficient resource of the system as a whole for a movable program.

As soon as the place of execution is determined, a job is requested to the computer in accordance with the mode and the place of program execution (1403). The destination of the requested job can be uniquely determined by the CPU-ID and the IP address. An actual job is executed in any one of the forms shown in 201 of FIG. 2, including the case in which the program on the client terminal is started (1404), the case in which the program on the server is interactively executed (1405), or in the case where the program on the server is executed in batch (1406). In execution, a communication is established with the computer at the place of execution in accordance with the particular job according to the program executed. The terminal management agent 107 participates at the termination of the job. At the time of job termination, a new file may be generated as a result of execution of the process, in which case the file is required to be registered as a user file. In the case where a new file is generated (1407), the system administration server registers the newly generated file (1408). The newly-generated file information 1409 is sent to the system administration agent 105, which in turn registers the file information in the file management table 510 of the related server of the system resource management information table 203 shown in FIG. 5, while at the same time registering the file information in the file management table of the user management information table shown in FIG. 8. Then, in the case where the program has been loaded at the place of execution (1410), the program loaded at the place of execution (terminal or server) is depleted (1411) as the job termination process. In the case where the file was moved (copied) to the place of execution (1412) and in the case where the file copied to the place of execution (terminal or server) is updated, then the update information is reflected in the file at the origin and the file moved to the place of execution is deleted (1413). The information on whether the program is loaded or not or the information on the origin of movement are acquired by the terminal management agent 107 from the information of 1008 in FIG. 10.

An embodiment was described above, in which the whole system is managed integrally by the cooperation among the system administration agent 105, the server management agent 106 and the terminal management agent 107. In this method, regardless of the terminal from which a user logs in to the system, the resources (program and file data) usable by the user in the system including the appearance (interface) thereof remain unchanged for the user. Also, in response to a job request from a terminal, an optimum place of execution in the system is automatically detected and processed.

Several modifications of this embodiment will be explained below.

Although the present embodiment was described with a single job, the process of Executing several jobs can also be realized by the cooperation between the system administration agent and the terminal management agent in similar fashion. Two methods are available. In a first method, the place of execution is determined by the system administration agent using the above-mentioned algorithm for determining the place of execution repeatedly at the time of a request for all the jobs in coordination, and the resulting determination is returned to the terminal management agent which executes the jobs sequentially. In a second method, the system administration agent is inquired of the optimum place of execution of each job sequentially each time, which job is executed, followed by determining the place of execution of the succeeding job. In realizing this process, the process at the terminal management agent described above is repeated as many times as the number of jobs in coordination.

According to this embodiment, the processing load is held in the field of 516 in FIG. 5 as an estimated value (or a statistical value) of an average load of the program, and the place of execution is determined with reference to the estimated value. The processing load, however, depends also to a large measure on the file to be processed and is not an established value. An alternative method, therefore, is for the user to report (enter) the amount of the processing load at the time of job request, which amount can be used as a substitute.

According to this embodiment, the place of execution of a process is determined by a predetermined algorithm (FIGS. 11 to 13), and the place of execution is searched for at the terminal, the program location and the file location in that order of priority. In a modification, however, the file location can be considered in priority to the program location. Unlike in the present embodiment in which the order is fixed for searching for the place of execution by the system, the user may alternatively select the order.

According to this embodiment, the parameters α, β, γ used in the judgement equation for determining the place of execution are fixed in FIGS. 11 and 13. These parameters, however, may alternatively be changed dynamically in accordance with the amount of the resources of the system as a whole. As another alternative, these parameters may be set in accordance with the distribution of average capacity of the servers making up the system.

According to the present embodiment, a program loaded at a given place of execution for a given process is deleted unconditionally after the termination of the process (1411, 1413 in FIG. 14). Instead, a program frequently loaded may remain loaded, and can be used as it is without being reloaded in the next session. This can be realized by registering the particular program in 510 of the system resource management information table 203 in FIG. 5. For registration, only the location on the corresponding line of the table of the loading origin of the program is changed and copied to the location on the server at the place of execution.

Figure 15:
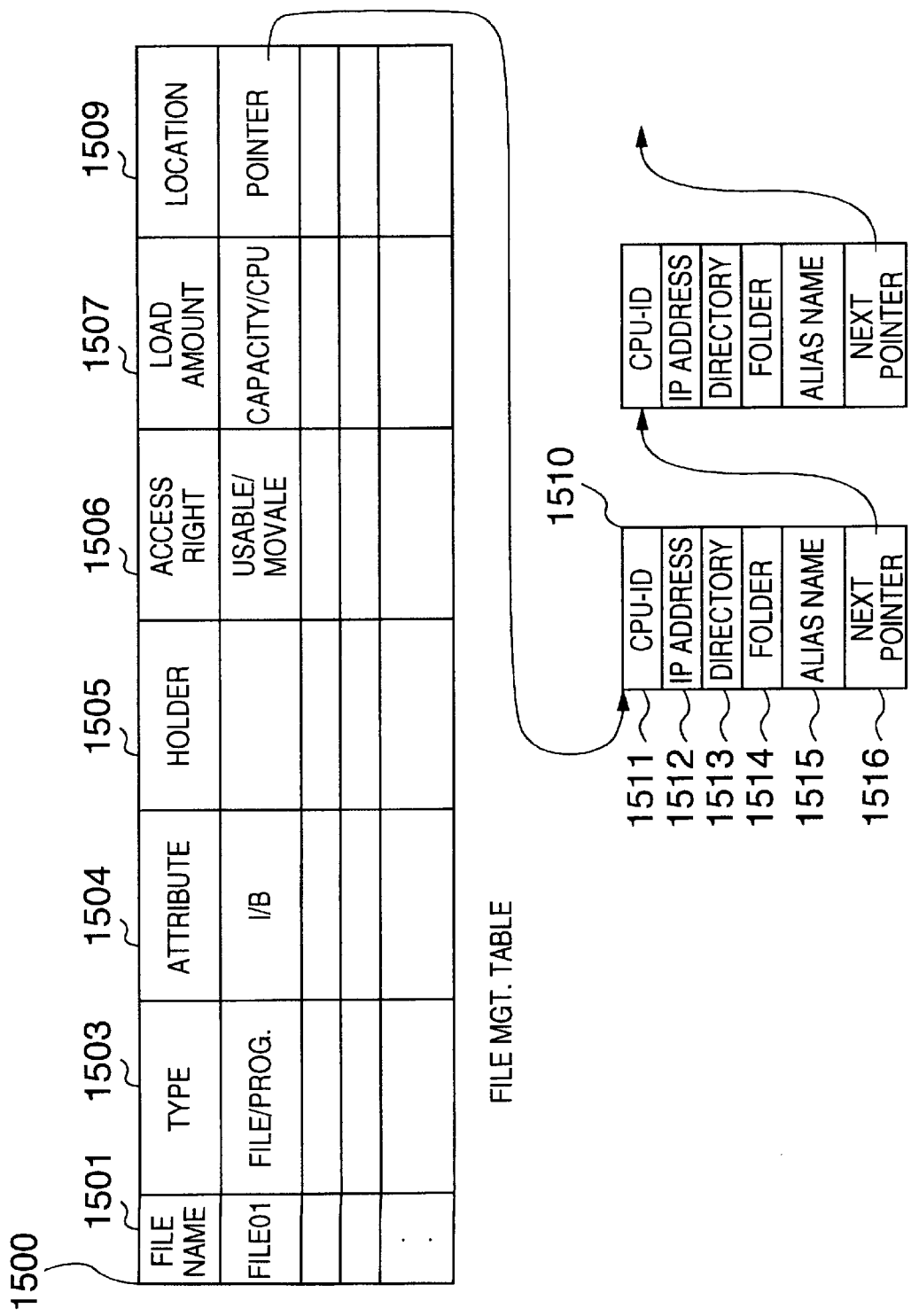
FIG. 15 is a diagram showing a structure of a file management table.

According to this embodiment, the process is realized based on the system resource management table of FIG. 5 with the computer as a header. In this embodiment, the location of a program is detected by searching the table of 510 of FIG. 5 from the computer. In contrast, a method is conceivable in which a table is prepared with a file as a header. FIG. 15 shows a configuration of such a table. This table is so configured that a plurality of locations of a file can be held. Numeral 1500 designates a table having the same contents as the table 510 in FIG. 5. In the table 1500, however, the location 1509 provides a pointer to the subtable 1510 indicating the location. The subtable 1510 includes a CPU-ID 1511 for specifying a computer, an IP address 1512 for indicating an address in the system network, and a directory 1513 and a folder 1514 indicating a position on the computer as a file location. Any alternative specific name which may exist on the individual computer is stored in an alias name 1515. In the presence of other locations, a plurality of locations can be stored by a pointer 1516 to another subtable of the same format. Using this table, the server having a program 1109 in FIG. 11 can be easily extracted. Also, this table can be referenced for otter information as required, while the table 510 in FIG. 5 and the table 803 in FIG. 8 can be referenced as a table containing only the file names. In spite of this, the matching with the system resource management table 203 is required to be assured. In the case where the loading program described above is made to reside as it is, for example, the operation is necessary for coupling the server to a corresponding file column as a subtable of 1510.

Figure 16:
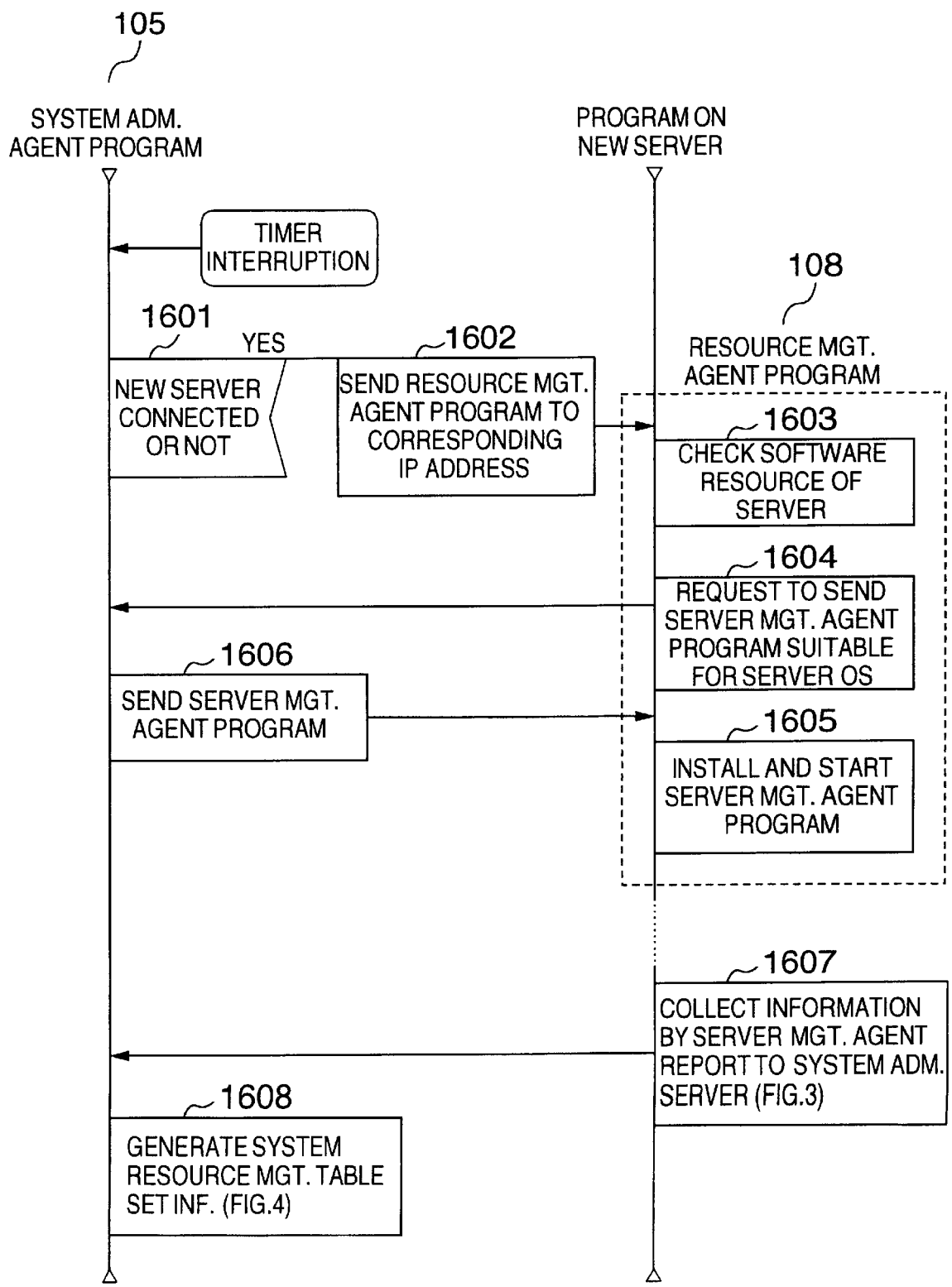
FIG. 16 is a flowchart for the operation of a resource management agent.

Now, the process to be executed in the case where a new server is connected to the network system will be explained with reference to FIG. 16. In the case of a timer interruption or upon detection of a new resource addition, the system administration agent 105 performs the process described below and retrieves the new server as a part of the resources in the network system. The connection or disconnection of the new server is checked (1601), or in some cases, the resource management agent program 108 is sent to the IP address (1602). The servers in the system are registered in 500 of FIG. 5, and a server for which information after the pointer is not set is judged as a new server. The main function of the resource management agent program 108 is to install and start the server management agent program on the server. First, the software resources of the server are checked (1603). For this purpose, the type and version of the operating system (OS) mounted on the server are checked. On the basis of this study, the server management agent program suitable for the operating system of the server is sent to the system administration agent 105 (1604). In response to this, the system administration agent 105 sends the corresponding server management agent program (1606). The resource management agent 108 installs and starts the server management agent program on the server thereby to terminate the process. Subsequently, as described with reference to FIG. 3, the information is collected by the server management agent with a given interruption as a motive, and the information thus collected is reported to the system administration server (1607). If the system administration agent has received the particular information for the first time, a system resource table is generated (501, 502, 505, 510 in FIG. 5) and the acquired information is set (1608). As a result, the new server is built in as a part of the resources of this system. In the process, the resource management agent program is prepared in a language (such as Java language) free of the platform in a manner operable with any server.

In the process up to this stage, the optimum place of execution and the temporary loading of the file in the computer at the place of execution were first determined as required, on the basis of the file location. Once the system is started, however, the problem may arise as to a more appropriate location of the file taking the efficient operation of the whole system into consideration on the basis of the loading frequency and the statistical information on the transfer rate of the file. In the embodiments described below, a method of copying or moving the file between servers in such a case will be described with reference to FIGS. 17 and 18.

First, the file management table described with reference to FIG. 15 is expanded and arranged to record the server on which each file has been used for processing. FIG. 18 shows an example of such an expansion. A field is prepared in which to store the number of executions 1801 providing the number of times a particular file is used for processing and also to store the pointer 1802 indicating a table storing each place of execution. The subtable 1810 for storing the number of executions at each place of execution has the CPU-ID and the IP address indicating the place of execution and the total number of times 1805 used for the process. The subtable is connected by as many pointers as different places of execution. Once the place of execution of a job is determined, the number of executions 1801 for the particular file is counted up. If the place of execution is already registered in the chain of the places of execution of 1802, the number of executions 1805 in the subtable is counted up. Otherwise, a new subtable is connected to the tail end of the chain, and the number of execution is set to one. This operation, if inserted in 1116 of FIG. 11, can hold the information.

Figure 17:
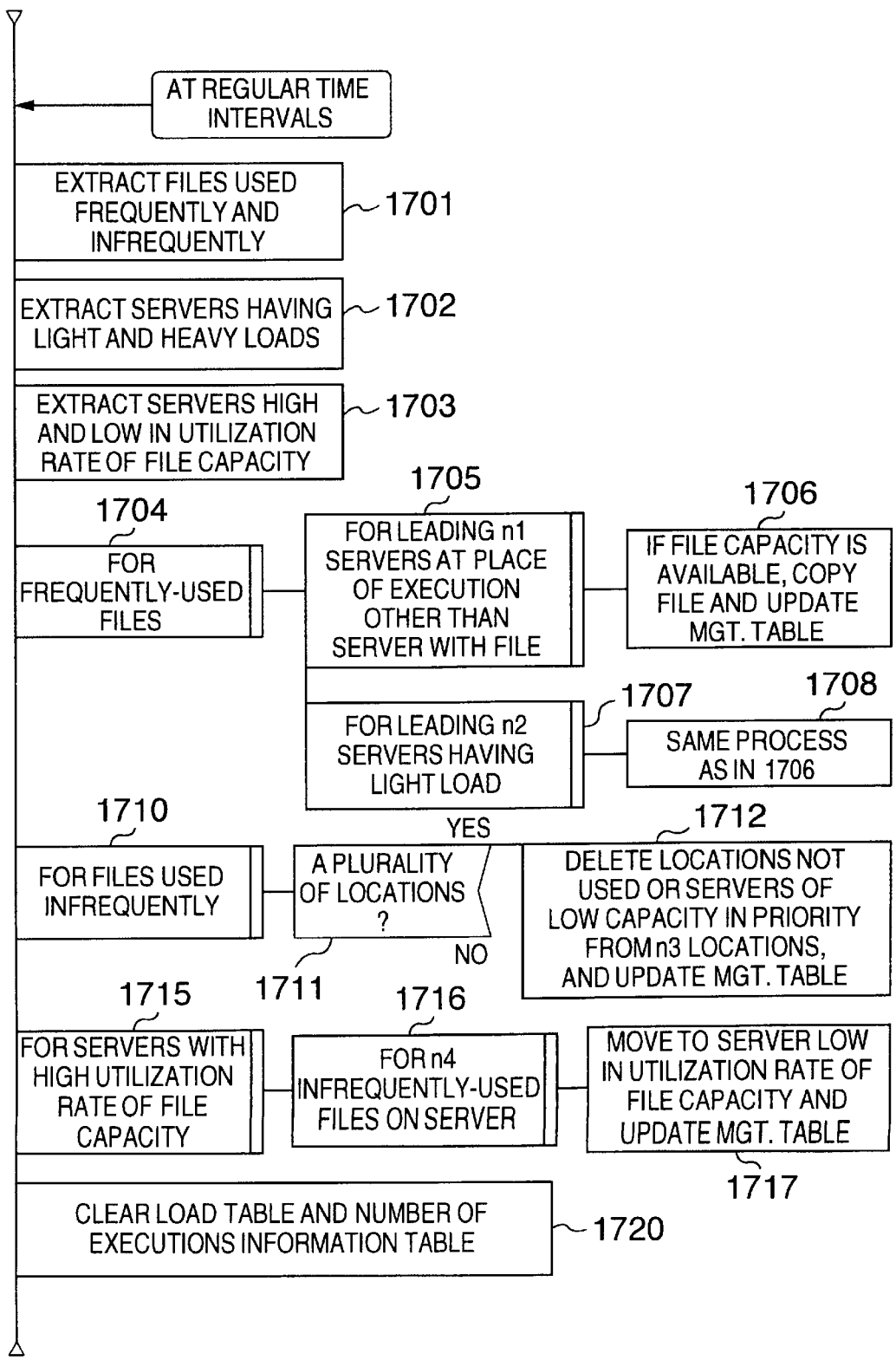
FIG. 17 is a flowchart for file transfer by a system administration agent.

In FIG. 17, the system administration agent 105 performs the process described below at regular intervals of time thereby to dynamically rearrange the files. Regular intervals may be one week or each time the number of job requests reaches 1000, for example. First, files frequently used and less frequently used are extracted (1701). The number of files extracted can be specifically determined in the descending order of frequency in advance. This extraction is possible by reference to the number of executions 1801 of FIG. 18. Then, several leading servers in terms of light and heavy weights of the server load are extracted (1702). This can be accomplished by calculating the average margin of each server from the statistical consumption based on the operating condition table 505 of the system resource management information table of FIG. 5 and the hardware resource 502. Then, servers high and low in the utilization rate of the file capacity can be extracted using the system resource management information table in similar fashion. The number of the leading servers to be extracted can be determined as, say, 5% of the total number of files or as, say, 10% of all the servers. In accordance with these figures, the file is moved under certain conditions.

The conditions can be set as follows:

(1) In the case where a given file is used with a high degree of frequency and often used by being loaded in other servers, then the file is provided for the servers liable to be often loaded. A server with a light resource load is provided with a copy.

(2) If a plurality of files of the same type used with a low degree of frequency are arranged on the server, a part of them are deleted from the server.

(3) A file used with a low degree of frequency is moved from a server having a large utilization rate of the file capacity to a server with a small utilization of the file capacity.

These conditions are actually fulfilled by following the procedure described below. In the description that follow, characters n1, n2, n3, n4 designate predetermined constants. The resources are not rearranged to an extreme extent based on the information at a given time, but in view of the fact that the situation may subsequently change considerably in dependence on the utilization rate of the user, the number is set to 1 or 2 assuming that the rate of change is small.

The extracted file used with a high degree of frequency is subjected to the following process (1704). In the case where the leading n1 servers at the place of execution other than the server with the particular file (1704) have an unoccupied file capacity, the particular file is copied to that server and the management table is updated accordingly (1706). In this case, the servers at the place of execution other than the server having the file are extracted in the descending order of the number of executions 1805, from among those having the CPU-ID of other than the location of the file in the connection table 1810 in FIG. 18. Also, the management table is updated in such a manner that the subtable 1510 of the server to which the file is copied is generated in the chain of the locations in FIG. 18, and the subtable 1510 thus generated is connected to the tail end of the chain. Further, the file is registered in the file management table for the corresponding server of the system resource management table shown in FIG. 5. Furthermore, the leading n2 servers with small load (1707) are processed in the same way as in 1706 (1708).

An extracted file used with a low degree of frequency is subjected to the following process (1710). In the case where such a file is located at a plurality of places (1711), the files are deleted from n3 locations not used or in the descending order of server capacity, and the management table is updated accordingly (1712). In the process, both the file location 1509 and the place of execution 1802 can be determined by reference to the table in FIG. 18. The locations not used, therefore, can be extracted. Also, by reference to the table of FIG. 5, the capacity of each server can be extracted.

An extracted server with a low utilization rate of file capacity is subjected to the following process (1715). The leading n4 files used with low frequency on the server (1716) are moved to a server used with low utilization rate of file capacity, and the management table is updated accordingly (1717). This process is substantially identical to that of 1706. A server with a low utilization rate of file capacity can be extracted by reference to the tables in FIG. 5 in similar manner.

The present invention is not limited to the above-mentioned embodiments, but includes various modifications without departing from the scope and spirit of the invention.

We claim:

1. A method of controlling a computer system including a plurality of computers interconnected through a network, said method comprising the steps of:

causing each of said computers to acquire computer resource information and operating condition information for resources including a CPU, a file and a memory, and user resource information including file data and a program, and to monitor said information;

causing a specific computer A in said computer system to collect said computer resource information, said operating condition information and said user resource information from each of said computers and to manage said information;

causing said computer A to select a computer C in said computer system as an optimum place of execution of a given process using the information regarding the location of said file data and location of said program and the information on the operating conditions of said computer resources when a user requests said given process using said file data and said program from said computer system through a computer B; and causing said computer C to execute said process requested by said user;

wherein the most efficient mode of execution as of the time of the process request is dynamically determined with the whole of said computer system as the user resources.

2. A method of controlling a computer system according to claim 1, wherein said step of causing said computer C to execute the requested process includes the step of causing said computer B that receives an indication of the place of execution from said computer A to request said computer C again to execute the process that was requested by said user, whereby said process requested by said user is executed without the user being aware of the place of execution thereof.

3. A method of controlling a computer system according to claim 1, wherein said step of causing said computer C to execute requested process includes the step of moving or copying the corresponding program or file data from the location thereof in the absence of said program or file data, on said computer C, wherein said process is executed without said user being aware of the actual place of execution of the process requested by said user.

4. A method of controlling a computer system according to claim 1, wherein said step of causing said computer C to execute the requested process includes the step of reflecting a change in the file data at the original location thereof when there exists no corresponding file data on said computer C and said file data is copied from the location thereof, resulting in said file data being changed by said process.

5. A method of controlling a computer system according to claim 3, wherein said step of causing said computer C to execute the requested process includes the steps of:

judging whether a corresponding program not existing on said computer C and moved or copied from the location thereof and processed is to remain or be deleted from said computer C after termination of said process; and deleting said program based on said judgement.

6. A method of controlling a computer system according to claim 3, further comprising the steps of:

reporting a new file data as a resource of the user on said computer C to said computer A, said new file data being generated as a result of execution of the process on said computer C; and causing said computer A to update said computer resource information, wherein the user resources are managed for the whole computer system regardless of a specific computer on which said process is executed.

7. A method of controlling a computer system according to claim 1, wherein said step of selecting said computer C includes the steps of:

determining whether movement of a program is possible;

determining a place of execution in dependence on a load including the amount of calculation and the memory capacity of the requested process at each of said determining steps on the basis of four choices including the location of said program, the location of said file data, a computer through which said user has logged in to the system and a computer having a high processing capacity usable as of the time of said process request.

8. A method for controlling a computer system including a plurality of computers interconnected through a network, said method comprising the steps of:

causing each of said computers to acquire computer resource information and operating condition information for resources including a CPU, a file and a memory and user resource information including file data and a program, and to monitor said information;

causing a specific computer A in said computer system to collect said computer resource information, said operating condition information and said user resource information from each of said computers and to manage said information; and extracting file data owned by a user and a program usable by said user over the whole of said computer system and displaying said extracted file data and said extracted program on a computer B, when said user logs on to said computer system through said computer B, wherein a uniform user interface is provided regardless of any computer that has logged on to the computer system.

9. A method of controlling a computer system according to claim 8, wherein said step of displaying said extracting data file and said extracted program includes the step of displaying the file data and the programs of said user on said computer B regardless of the locations of said file data and said programs.

10. A method of controlling a computer system including a plurality of computers interconnected through a network, said method comprising the steps of:

causing each of said computers to acquire computer resource information and operating condition information for resources including a CPU, a file and a memory and user resource information including file data and a program, and to monitor said information;

causing a specific computer A in said computer system to collect said computer resource information, said operating condition information and said user resource information from each of said computers and to manage said information;

detecting a newly connected computer X by patrolling the computers connected to said network through said network;

setting a program to said computer X, by said program computer resource information and operating condition information for resources including a CPU, a file, a memory and user resource information including file data and a program are acquired and sent to said computer A;

automatically placing said computer X under the management of said computer system; and causing said computer A to move said file data and said programs of said computer existing before a connection of said computer X automatically to said computer X in order to improve execution efficiency of said computer system as a whole.

11. A method of controlling a computer system including a plurality of computers interconnected through a net work, said method comprising the steps of:

causing each of said computers to acquire computer resource information and operating condition information for resources including a CPU, a file and a memory and user resource information including file data and a program, and to monitor said information;

causing a specific computer A in said computer system to collect said computer resource information, said operating condition information and said user resource information from each of said computers and to manage said information;

causing said computer A to select a given computer C as an optimum place of execution of a process in said computer system using the information regarding the location of file data and location of a program and the information regarding the operating conditions of said computer resource when a user requests said process using said file data and said program to said computer system through a given computer B;

causing said computer C to execute said process requested by said user;

monitoring the utilization of the file data and the program and the movement of said file data and said program between computers for each process; and moving or copying a selected one of said file data and said program from the location thereof to another computer on the basis of the statistical data obtained as a result of said step of monitoring the utilization and the movement between the computers of said file data and said program;

wherein said file data and said program are moved or copied according to the utilization thereof during a predetermined period.

12. A method of controlling a computer system according to claim 11, wherein said step of moving or copying said file data and said program includes the steps of:

generating parameters including the utilization rate of each of said files during a predetermined period, the frequency and destination of movement of each of said files for utilization thereof and the utilization rate of the file region at an actual location thereof; and determining the movement and deletion of a file on the basis of the values of said parameters.

13. A method of controlling a computer system including a plurality of computers interconnected through a network, said method comprising the steps of:

causing a specific computer A in said computer system to manage the computer resource information and the operating condition information for resources including a CPU, a file and a memory and user resource information including file data and a program of each computer of said computer system;

reporting any log on request issued by a user from a computer C in said computer system to said computer A, and returning the information on said user to said computer C with reference to the user resource information held by said computer A; and causing said computer C to acquire a file and a usable program held by the user in said computer system and to execute a process using said information.

* * * * *